(12) United States Patent
Liu et al.

(10) Patent No.: US 11,930,487 B2
(45) Date of Patent: Mar. 12, 2024

(54) TERMINAL APPARATUS IDENTIFICATION METHOD AND APPARATUS

(71) Applicant: HUAWEI TECHNOLOGIES CO., LTD., Guangdong (CN)

(72) Inventors: Jun Liu, Beijing (CN); Xiao Xiao, Shenzhen (CN); Junren Chang, Beijing (CN); Jun Wang, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 376 days.

(21) Appl. No.: 17/401,033

(22) Filed: Aug. 12, 2021

(65) Prior Publication Data

US 2022/0061068 A1 Feb. 24, 2022

Related U.S. Application Data

(63) Continuation of application No. PCT/CN2020/074748, filed on Feb. 11, 2020.

(30) Foreign Application Priority Data

Feb. 15, 2019 (CN) .......................... 201910118837.9

(51) Int. Cl.
*H04W 76/25* (2018.01)
*H04W 4/40* (2018.01)
(Continued)

(52) U.S. Cl.
CPC ......... *H04W 72/1263* (2013.01); *H04W 4/40* (2018.02); *H04W 68/005* (2013.01);
(Continued)

(58) Field of Classification Search
CPC ... A01C 17/001; A01C 17/008; H04W 12/06; H04W 12/71; H04W 12/76; H04W 4/08;
(Continued)

(56) References Cited

U.S. PATENT DOCUMENTS 9,883,511 B1 1/2018 Yang et al.
11,510,108 B2 * 11/2022 Ahmad .................. H04L 67/61
(Continued)

FOREIGN PATENT DOCUMENTS

CN 101030941 A 9/2007
CN 102547908 A 7/2012
(Continued)

OTHER PUBLICATIONS

3GPP TS 22.186 V15.3.0 (Jun. 2018), 3rd Generation Partnership Project; Technical Specification Group Services and System Aspects; Enhancement of 3GPP support for V2X scenarios; Stage 1 (Release 15), total 16 pages.
(Continued)

*Primary Examiner* — Syed Ali
(74) *Attorney, Agent, or Firm* — WOMBLE BOND DICKINSON (US) LLP

(57) ABSTRACT

Terminal apparatus identification methods and apparatuses are described. An access stratum (AS) of a first communications apparatus sends first information to an AS of a second communications apparatus. The AS of the second terminal apparatus may identify a leader terminal apparatus based on the first information, so as to implement perception of the leader terminal.

18 Claims, 9 Drawing Sheets

(51) Int. Cl.
*H04W 68/00* (2009.01)
*H04W 72/1263* (2023.01)
*H04W 76/14* (2018.01)
*H04W 92/18* (2009.01)

(52) U.S. Cl.
CPC ........... *H04W 76/14* (2018.02); *H04W 76/25* (2018.02); *H04W 92/18* (2013.01)

(58) Field of Classification Search
CPC . H04W 4/40; H04W 68/005; H04W 72/1263; H04W 76/11; H04W 76/14; H04W 76/25; H04W 76/40; H04W 8/186; H04W 92/18
See application file for complete search history.

(56) References Cited

U.S. PATENT DOCUMENTS

| | | | |
|---|---|---|---|
| 2016/0360466 | A1 | 12/2016 | Barak et al. |
| 2021/0274327 | A1* | 9/2021 | Zhao ............... H04L 1/1812 |
| 2021/0410162 | A1* | 12/2021 | Kang ............... H04W 72/23 |
| 2022/0007145 | A1* | 1/2022 | El Essaili ......... H04W 4/40 |
| 2022/0007378 | A1* | 1/2022 | Basu Mallick ..... H04L 5/0007 |
| 2022/0117032 | A1* | 4/2022 | Han ................. H04L 1/08 |
| 2022/0124466 | A1* | 4/2022 | Ali .................. H04W 4/40 |
| 2023/0308936 | A1* | 9/2023 | Li ................... H04W 80/02 370/229 |

FOREIGN PATENT DOCUMENTS

| | | |
|---|---|---|
| CN | 104768122 A | 7/2015 |
| CN | 106028311 A | 10/2016 |
| CN | 106559337 A | 4/2017 |
| CN | 107734590 A | 2/2018 |
| CN | 109246648 A | 1/2019 |
| EP | 3229549 A1 | 10/2017 |
| WO | 2014079312 A1 | 5/2014 |
| WO | 2018117775 A1 | 6/2018 |

OTHER PUBLICATIONS

3GPP TS 38.331 V15.4.0 (Dec. 2018), 3rd Generation Partnership Project; Technical Specification Group Radio Access Network;NR-;Radio Resource Control (RRC) protocol specification(Release 15), total 474 pages.

Qualcomm Incorporated: "Discussion on Groupcast for NRV2X", 3GPP Draft; R2 1817780—Discussion on NR V2XGROUPCAST, 3GPP, Nov. 12, 2018 (Nov. 12, 2018), XP051557297, Retrieved from the Internet:URL: http://www.3gpp.org/ftp/Meetings%5F3GPP%SFSYNC/RAN2/Docs/R2%2D1817780%2Ezip [retrieved on Nov. 12, 2018].

Huawei et al: "AS-related group management for platooning",3GPP Draft; R2-1817459 As-Related Groupcommunication for Platooning, 3GPP, Nov. 2, 2018(Nov. 2, 2018), XP051481362, Retrieved from the Internet:URL:http://www.3gpp.org/ftp/tsg%SFran/WG2%5FRL2/TSGR2%5F104/Docs/R2%2D1817459%2Ezip [retr. Nov. 2, 2018].

Huawei et al: "AS related group communication for platooning", 3GPP Draft; R2 1904882 AS-Related Groupcommunication for Platooning, 3GPP, Mar. 29, 2019.

Huawei et al: "AS coordination for SL groupcast", 3GPP Draft; R2-1904881 as Coordination for SLGROUPCAST, 3GPP, Apr. 6, 2019 (Apr. 6, 2019), XP051702160, Retrieved from the Internet: URL:http://www.3gpp.org/ftp/Meetings%5F3G PP%SFSYNC/RAN2/Docs/R2%2D1904881 %2Ezip [retrieved on Apr. 6, 2019].

* cited by examiner

TERMINAL APPARATUS IDENTIFICATION METHOD AND APPARATUS

CROSS-REFERENCE TO RELATED APPLICATIONS

This application is a continuation of International Application No. PCT/CN2020/074748, filed on Feb. 11, 2020, which claims priority to Chinese Patent Application No. 201910118837.9, filed on Feb. 15, 2019. The disclosures of the aforementioned applications are herein incorporated by reference in their entireties.

TECHNICAL FIELD

The application relates to the field of mobile communications technologies, and in particular, to a terminal apparatus identification method and an apparatus.

BACKGROUND

Currently, new radio (NR) proposes a solution in which one terminal assists a network device in allocating a resource to another terminal. In a scenario of a terminal apparatus group including a plurality of terminals, a leader terminal (leader UE) may be configured to assist the network device in allocating a resource to a member terminal in the terminal apparatus group.

However, currently, it is not specified how the network device and the member terminal that is in the terminal apparatus group perceive the leader terminal.

SUMMARY

The application provides a terminal apparatus identification method and an apparatus, to provide a solution of perceiving a leader terminal, and improve perception efficiency of the leader terminal.

In at least some embodiments, the application provides a terminal apparatus identification method. In at least some embodiments, for a method performed by a first communications apparatus, an access stratum AS of the first communications apparatus may send first information to an AS of a second communications apparatus, where the first information is used to determine that the first communications apparatus is a leader terminal apparatus in a terminal apparatus group. The terminal apparatus group is a terminal apparatus group to which the first communications apparatus belongs.

By using the foregoing method, the AS of the second communications apparatus may identify the leader terminal apparatus based on the first information, so as to implement perception of the leader terminal.

In at least some embodiments, the second communications apparatus may belong to the terminal apparatus group.

In at least some embodiments, the first information may include a mapping relationship between an upper-layer terminal identifier of the first communications apparatus and an AS identifier of the first communications apparatus, a mapping relationship between an upper-layer terminal identifier of the first communications apparatus and a vehicle-to-everything V2X layer identifier of the first communications apparatus, or an upper-layer terminal identifier of the first communications apparatus.

In at least some embodiments, the first communications apparatus may further send second information to the second communications apparatus, where the second information may be used to indicate an upper-layer terminal identifier of the leader terminal apparatus in the terminal apparatus group.

In at least some embodiments, the second information may include one or more of the following information: the upper-layer terminal identifier of the first communications apparatus (for example, may include the V2X layer identifier, an identifier of a layer above a V2X layer, or the V2X layer identifier and an identifier of the layer above a V2X layer), information used to indicate that the upper-layer terminal identifier is an identifier of the leader terminal apparatus in the terminal apparatus group, a group identifier group ID of the terminal apparatus group, an identifier of a member terminal in the terminal apparatus group, or information used to indicate a quantity of member terminals in the terminal apparatus group.

In at least some embodiments, when the first communications apparatus sends the second information to the second communications apparatus, an upper layer of the first communications apparatus may send the second information to an upper layer of the second communications apparatus in an authentication process between the first communications apparatus and the second communications apparatus, a group creation process, a group member joining process, or a discovery discovery process.

In at least some embodiments, the second information may be carried in any one of the following messages: a message used to request to set up a sidelink SL, a message used to indicate that an SL setup request is accepted, a message used to request to maintain an SL connection, or a message used to indicate that maintaining an SL connection is accepted. The SL is an upper-layer link between the first communications apparatus and the second communications apparatus.

In at least some embodiments, when the first communications apparatus sends the second information to the second communications apparatus, a V2X layer of the first communications apparatus may send the second information to a V2X layer of the second communications apparatus. Before the first communications apparatus sends the second information to the second communications apparatus, an upper layer of the V2X layer of the first communications apparatus may further notify the V2X layer of the first communications apparatus of third information, where the third information is used to indicate the upper-layer identifier of the leader terminal apparatus, is used to indicate that the first communications apparatus is the leader terminal apparatus, or is used to indicate the upper-layer identifier of the leader terminal apparatus and is used to indicate that the first communications apparatus is the leader terminal apparatus.

In at least some embodiments, the AS of the first communications apparatus may further send a logical channel identifier ID to the AS of the second communications apparatus, where the logical channel ID is used to indicate whether the message carries an AS message; or the AS of the first communications apparatus may send an AS message indication to the AS of the second communications apparatus, where the AS message indication is used to indicate whether the message carries an AS message. By using this design, the AS of the second communications apparatus may determine whether the received message carries the AS message.

In at least some embodiments, the V2X layer of the first communications apparatus may send the second information to the V2X layer of the second communications apparatus based on a PC5-S protocol.

In at least some embodiments, the first information may be carried in an radio resource control (RRC) message (for example, an RRC reconfiguration message), a physical layer message (for example, sidelink control information (SCI) or download control information (DCI), or a media access control (MAC) layer message (for example, a MAC control element (CE) message).

In at least some embodiments, the AS identifier of the first communications apparatus may include a physical layer identifier of the first communications apparatus. In an embodiment, the physical layer identifier of the first communications apparatus includes at least one of the following identifiers: a cell radio network temporary identifier C-RNTI of the first communications apparatus, a CS-RNTI of the first communications apparatus, an interruption radio network temporary identifier INT-RNTI of the first communications apparatus, a paging radio network temporary identifier P-RNTI of the first communications apparatus, a system information radio network temporary identifier SI-RNTI of the first communications apparatus, a semi-persistent channel state information radio network temporary identifier SP-CSI-RNTI of the first communications apparatus, a random access radio network temporary identifier RA-RNTI of the first communications apparatus, a temporary cell radio network temporary identifier temporary C-RNTI of the first communications apparatus, an inactive radio network temporary identifier I-RNTI of the first communications apparatus, a layer 1 source identifier of the first communications apparatus, or a layer 1 destination identifier of the first communications apparatus.

In at least some embodiments, the V2X layer identifier of the first communications apparatus may include a layer 2 identifier of the first communications apparatus. In an embodiment, the layer 2 identifier of the first communications apparatus may include a layer 2 source identifier of the first communications apparatus or a layer 2 destination identifier of the first communications apparatus.

In at least some embodiments, the first information may further include information used to indicate that the first communications apparatus is the leader terminal apparatus in the terminal apparatus group. For example, in a message sent by the first communications apparatus, when a value of a bit is set to 0 (or 1), it indicates that the first communications apparatus is the leader terminal apparatus.

In at least some embodiments, the first information may be carried in any one of the following messages: an AS groupcast message, an AS broadcast message, a PC5-RRC connection setup request message, a PC5-RRC connection setup message, a PC5-RRC connection reconfiguration message, a terminal capability reporting message, terminal assistance information, sidelink terminal information, a buffer status report, a message used to request to set up an SL, a message used to indicate that an SL setup request is accepted, or a message used to indicate configuration information of an SL, where the SL is an AS link between the first communications apparatus and the second communications apparatus.

In at least some embodiments, the first information includes one or more of the following information: the information used to indicate that the first communications apparatus is the leader terminal apparatus in the terminal apparatus group, a group identifier of the terminal apparatus group, an identifier of a member terminal in the terminal apparatus group, or information used to indicate a quantity of member terminals in the terminal apparatus group.

In at least some embodiments, the first information may include AS groupcast groupcast configuration information of the SL.

In at least some embodiments, the first communications apparatus may further send fourth information to the second communications apparatus, where the fourth information is used to indicate that the second communications apparatus is not allowed to forward and schedule a resource configuration to another terminal apparatus, and the another terminal apparatus is a terminal apparatus in the terminal apparatus group.

If the method is implemented by a second communications apparatus, in the terminal apparatus identification method provided in an embodiment of the application, an AS of the second communications apparatus may receive first information from an AS of a first communications apparatus, and the second communications apparatus may determine, based on the first information, that the first communications apparatus is a leader terminal apparatus in a terminal apparatus group. The first communications apparatus belongs to the terminal apparatus group.

In at least some embodiments, the second communications apparatus may belong to the terminal apparatus group.

In at least some embodiments, if the first information includes a first mapping relationship between an upper-layer terminal identifier of the first communications apparatus and an AS identifier of the first communications apparatus, when determining that the first communications apparatus is the leader terminal apparatus, the AS of the second communications apparatus may determine an AS terminal identifier of the leader terminal apparatus based on an upper-layer terminal identifier of the leader terminal apparatus and the first mapping relationship. If the AS identifier of the first communications apparatus is the same as the AS terminal identifier of the leader terminal apparatus, the first communications apparatus is the leader terminal apparatus.

In at least some embodiments, if the first information includes a second mapping relationship between an upper-layer terminal identifier of the first communications apparatus and a V2X layer identifier of the first communications apparatus, when determining that the first communications apparatus is the leader terminal apparatus, the AS of the second communications apparatus may determine a V2X layer terminal identifier of the leader terminal apparatus based on an upper-layer terminal identifier of the leader terminal apparatus and the second mapping relationship. The V2X layer identifier of the leader terminal apparatus may be determined based on the AS terminal identifier of the first communications apparatus. If the V2X layer identifier of the first communications apparatus is the same as the V2X layer terminal identifier of the leader terminal apparatus, the second communications apparatus may determine that the first communications apparatus is the leader terminal apparatus.

In at least some embodiments, if the first information includes an upper-layer terminal identifier of the first communications apparatus, when determining that the upper-layer terminal identifier of the first communications apparatus is the same as an upper-layer terminal identifier of the leader terminal apparatus, the AS of the second communications apparatus determines that the first communications apparatus is the leader terminal apparatus.

In at least some embodiments, an upper layer of the second communications apparatus may further receive second information from an upper layer of the first communications apparatus, where the second information is used to indicate the upper-layer terminal identifier of the leader terminal apparatus in the terminal apparatus group. The upper layer of the second communications apparatus may further indicate the upper-layer terminal identifier of the leader terminal apparatus to the AS of the second communications apparatus.

In at least some embodiments, the second information includes one or more of the following information: the upper-layer terminal identifier of the first communications apparatus (may include the V2X layer identifier, an identifier of a layer above a V2X layer, or the V2X layer identifier and an identifier of a layer above a V2X layer), information used to indicate that the upper-layer terminal identifier is an identifier of the leader terminal apparatus in the terminal apparatus group, a group ID of the terminal apparatus group, an identifier of a member terminal in the terminal apparatus group, or information used to indicate a quantity of member terminals in the terminal apparatus group.

In at least some embodiments, the upper layer of the second communications apparatus may receive the second information from the upper layer of the first communications apparatus in an authentication process between the first communications apparatus and the second communications apparatus, a group creation process, a group member joining process, or a discovery process.

In at least some embodiments, the first information may be carried in an RRC message (for example, an RRC reconfiguration message), a physical layer message (for example, SCI or DCI), or a media access control layer MAC message (for example, a MAC control element CE message).

In at least some embodiments, the second information may be carried in any one of the following messages: a message used to request to set up an SL, a message used to indicate that an SL setup request is accepted, a message used to request to maintain an SL connection, or a message used to indicate that maintaining an SL connection is accepted, where the SL is an upper-layer link between the first communications apparatus and the second communications apparatus.

In at least some embodiments, the AS of the second communications apparatus may further receive a logical channel ID from the AS of the first communications apparatus, where the logical channel ID is used to indicate whether the message carries an AS message; or the AS of the second communications apparatus may further receive an AS message indication from the AS of the first communications apparatus, where the AS message indication is used to indicate whether the message carries an AS message.

In at least some embodiments, the AS identifier of the first communications apparatus may include a physical layer identifier of the first communications apparatus. In an embodiment, the physical layer identifier of the first communications apparatus may include at least one of the following identifiers: a cell radio network temporary identifier C-RNTI of the first communications apparatus, a CS-RNTI of the first communications apparatus, an interruption radio network temporary identifier INT-RNTI of the first communications apparatus, a paging radio network temporary identifier P-RNTI of the first communications apparatus, a system information radio network temporary identifier SI-RNTI of the first communications apparatus, a semi-persistent channel state information radio network temporary identifier SP-CSI-RNTI of the first communications apparatus, a random access radio network temporary identifier RA-RNTI of the first communications apparatus, a temporary cell radio network temporary identifier temporary C-RNTI of the first communications apparatus, an inactive radio network temporary identifier I-RNTI of the first communications apparatus, a layer 1 source identifier of the first communications apparatus, or a layer 1 destination identifier of the first communications apparatus.

In at least some embodiments, the V2X layer identifier of the first communications apparatus may include a layer 2 identifier of the first communications apparatus. In an embodiment, the layer 2 identifier of the first communications apparatus may include a layer 2 source identifier of the first communications apparatus or a layer 2 destination identifier of the first communications apparatus.

In at least some embodiments, the first information may include information used to indicate that the first communications apparatus is the leader terminal apparatus in the terminal apparatus group.

In at least some embodiments, the first information may be carried in any one of the following messages: an AS groupcast message, an AS broadcast message, a PC5-RRC connection setup request message, a PC5-RRC connection setup message, a PC5-RRC connection reconfiguration message, a terminal capability reporting message, terminal assistance information, sidelink terminal information, a buffer status report, a message used to request to set up an SL, a message used to indicate that an SL setup request is accepted, or a message used to indicate configuration information of an SL, where the SL is an AS link between the first communications apparatus and the second communications apparatus.

In at least some embodiments, the first information may include one or more of the following information: the information used to indicate that the first communications apparatus is the leader terminal apparatus in the terminal apparatus group, a group ID of the terminal apparatus group, an identifier of a member terminal in the terminal apparatus group, or information used to indicate a quantity of member terminals in the terminal apparatus group.

In at least some embodiments, the first information includes AS groupcast groupcast configuration information of the SL.

In at least some embodiments, if the second communications apparatus is a network device, the second communications apparatus may further send fifth information to a third communications apparatus, where the fifth information is used to indicate that the third communications apparatus is not allowed to forward and schedule a resource configuration to another communications apparatus, and the third communications apparatus and the another communications apparatus are terminal apparatuses in the terminal apparatus group. The network device may further send indication information to the leader terminal, where the indication information is used to indicate that the leader terminal is allowed to forward, schedule, or both forward and schedule the resource configuration to the member terminal in the terminal apparatus group, or the indication information is used to indicate that the leader terminal is not allowed to forward, schedule, or both forward and schedule the resource configuration to the member terminal in the terminal apparatus group.

An embodiment of the application further provides a terminal apparatus identification method. When the method is performed by a first communications apparatus, the first communications apparatus may send SL AS groupcast groupcast configuration information to a second communications apparatus, where the first communications apparatus and the second communications apparatus belong to a same terminal apparatus group, and the AS groupcast groupcast configuration information is used by the second communications apparatus to configure an SL AS groupcast parameter.

By using the foregoing method, the first communications apparatus may indicate the SL AS groupcast parameter to the second communications apparatus by using the SL AS groupcast groupcast configuration information.

When the method is performed by a second communications apparatus, the second communications apparatus may receive SL AS groupcast groupcast configuration information from a first communications apparatus, where the first communications apparatus and the second communications apparatus belong to a same terminal apparatus group, and the SL AS groupcast groupcast configuration information is used by the second communications apparatus to configure an SL AS groupcast parameter.

In at least some embodiments, the application provides a communications apparatus. The communications apparatus may be configured to perform functions by the first communications apparatus or the second communications apparatus according to embodiments as described herein. The function may be performed by hardware, or by hardware executing corresponding software. The hardware or the software includes one or more modules corresponding to the functions, method operations, or operations according to embodiments as described herein.

In at least some embodiments, the communications apparatus may include a transceiver unit and a processing unit. The transceiver unit may be used by the communications apparatus to perform communication, and the processing unit may be used by the communications apparatus to perform functions of the first communications apparatus or the second communications apparatus according to of the embodiments as described herein.

In at least some embodiments, the transceiver unit may be configured to send first information to an AS of the second communications apparatus by using an AS of the first communications apparatus, where the first information is used to determine that the first communications apparatus is a leader terminal apparatus in a terminal apparatus group. The terminal apparatus group is a terminal apparatus group to which the first communications apparatus belongs.

In at least some embodiments, the second communications apparatus may belong to the terminal apparatus group.

In at least some embodiments, the first information may include a mapping relationship between an upper-layer terminal identifier of the first communications apparatus and an AS identifier of the first communications apparatus, a mapping relationship between an upper-layer terminal identifier of the first communications apparatus and a vehicle-to-everything V2X layer identifier of the first communications apparatus, or an upper-layer terminal identifier of the first communications apparatus.

In at least some embodiments, the transceiver unit may be further configured to send second information to the second communications apparatus, where the second information may be used to indicate an upper-layer terminal identifier of the leader terminal apparatus in the terminal apparatus group.

In at least some embodiments, the second information may include one or more of the following information: the upper-layer terminal identifier of the first communications apparatus (may include the V2X layer identifier, an identifier of a layer above a V2X layer, or the V2X layer identifier and an identifier of a layer above a V2X layer), information used to indicate that the upper-layer terminal identifier is an identifier of the leader terminal apparatus in the terminal apparatus group, a group identifier group ID of the terminal apparatus group, an identifier of a member terminal in the terminal apparatus group, or information used to indicate a quantity of member terminals in the terminal apparatus group.

In at least some embodiments, the transceiver unit may send, by using an upper layer of the first communications apparatus, the second information to an upper layer of the second communications apparatus in an authentication process between the first communications apparatus and the second communications apparatus, a group creation process, a group member joining process, or a discovery process.

In at least some embodiments, the second information may be carried in any one of the following messages: a message used to request to set up a sidelink SL, a message used to indicate that an SL setup request is accepted, a message used to request to maintain an SL connection, or a message used to indicate that maintaining an SL connection is accepted. The SL is an upper-layer link between the first communications apparatus and the second communications apparatus.

In at least some embodiments, the transceiver unit may further send the second information to a V2X layer of the second communications apparatus by using a V2X layer of the first communications apparatus. Before the transceiver unit sends the second information, the processing unit may be configured to notify the V2X layer of the first communications apparatus of third information by using an upper layer of the first communications apparatus, where the third information is used to indicate the upper-layer identifier of the leader terminal apparatus, is used to indicate that the first communications apparatus is the leader terminal apparatus, or is used to indicate the upper-layer identifier of the leader terminal apparatus and is used to indicate that the first communications apparatus is the leader terminal apparatus.

In at least some embodiments, the transceiver unit may be further configured to send a logical channel identifier ID to the AS of the second communications apparatus by using the AS of the first communications apparatus, where the logical channel ID is used to indicate whether the message carries an AS message; or the transceiver unit may be further configured to send an AS message indication to the AS of the second communications apparatus by using the AS of the first communications apparatus, where the AS message indication is used to indicate whether the message carries an AS message. By using this design, the AS of the second communications apparatus may determine whether the received message carries the AS message.

In at least some embodiments, the transceiver unit may further send the second information to the V2X layer of the second communications apparatus based on a PC5-S protocol by using the V2X layer of the first communications apparatus.

In at least some embodiments, the first information may be carried in an RRC message (for example, an RRC reconfiguration message), a physical layer message (for example, SCI or DCI), or a media access control layer MAC message (for example, a MAC control element CE message).

In at least some embodiments, the AS identifier of the first communications apparatus may include a physical layer identifier of the first communications apparatus. In an embodiment, the physical layer identifier of the first communications apparatus includes at least one of the following identifiers: a cell radio network temporary identifier C-RNTI of the first communications apparatus, a CS-RNTI of the first communications apparatus, an interruption radio network temporary identifier INT-RNTI of the first communications apparatus, a paging radio network temporary identifier P-RNTI of the first communications apparatus, a system information radio network temporary identifier SI-RNTI of the first communications apparatus, a semi-persistent channel state information radio network temporary identifier SP-CSI-RNTI of the first communications apparatus, a random access radio network temporary identifier RA-RNTI of the first communications apparatus, a temporary cell radio network temporary identifier temporary C-RNTI of the first communications apparatus, an inactive radio network temporary identifier I-RNTI of the first communications apparatus, a layer 1 source identifier of the first communications apparatus, or a layer 1 destination identifier of the first communications apparatus.

In at least some embodiments, the V2X layer identifier of the first communications apparatus may include a layer 2 identifier of the first communications apparatus. In an embodiment, the layer 2 identifier of the first communications apparatus may include a layer 2 source identifier of the first communications apparatus or a layer 2 destination identifier of the first communications apparatus.

In at least some embodiments, the first information may further include information used to indicate that the first communications apparatus is the leader terminal apparatus in the terminal apparatus group. For example, in a message sent by the first communications apparatus, when a value of a bit is set to 0 (or 1), it indicates that the first communications apparatus is the leader terminal apparatus.

In at least some embodiments, the first information may be carried in any one of the following messages: an AS groupcast message, an AS broadcast message, a PC5-RRC connection setup request message, a PC5-RRC connection setup message, a PC5-RRC connection reconfiguration message, a terminal capability reporting message, terminal assistance information, sidelink terminal information, a buffer status report, a message used to request to set up an SL, a message used to indicate that an SL setup request is accepted, or a message used to indicate configuration information of an SL, where the SL is an AS link between the first communications apparatus and the second communications apparatus.

In at least some embodiments, the first information includes one or more of the following information: the information used to indicate that the first communications apparatus is the leader terminal apparatus in the terminal apparatus group, a group identifier of the terminal apparatus group, an identifier of a member terminal in the terminal apparatus group, or information used to indicate a quantity of member terminals in the terminal apparatus group.

In at least some embodiments, the first information may include AS groupcast groupcast configuration information of the SL.

In at least some embodiments, the transceiver unit may further send fourth information to the second communications apparatus, where the fourth information is used to indicate that the second communications apparatus is not allowed to forward and schedule a resource configuration to another terminal apparatus, and the another terminal apparatus is a terminal apparatus in the terminal apparatus group.

In at least some embodiments, to perform functions by the second communications apparatus, the transceiver unit may receive first information from an AS of a first communications apparatus by using an AS of the second communications apparatus, and the processing unit determines, based on the first information, that the first communications apparatus is a leader terminal apparatus in a terminal apparatus group. The first communications apparatus belongs to the terminal apparatus group.

In at least some embodiments, the second communications apparatus may belong to the terminal apparatus group.

In at least some embodiments, if the first information includes a first mapping relationship between an upper-layer terminal identifier of the first communications apparatus and an AS identifier of the first communications apparatus, when determining that the first communications apparatus is the leader terminal apparatus, the processing unit may determine an AS terminal identifier of the leader terminal apparatus based on an upper-layer terminal identifier of the leader terminal apparatus and the first mapping relationship. If the AS identifier of the first communications apparatus is the same as the AS terminal identifier of the leader terminal apparatus, the processing unit may determine that the first communications apparatus is the leader terminal apparatus.

In at least some embodiments, if the first information includes a second mapping relationship between an upper-layer terminal identifier of the first communications apparatus and a V2X layer identifier of the first communications apparatus, when determining that the first communications apparatus is the leader terminal apparatus, the processing unit may determine a V2X layer terminal identifier of the leader terminal apparatus based on an upper-layer terminal identifier of the leader terminal apparatus and the second mapping relationship. The V2X layer identifier of the leader terminal apparatus may be determined based on the AS terminal identifier of the first communications apparatus. If the V2X layer identifier of the first communications apparatus is the same as the V2X layer terminal identifier of the leader terminal apparatus, the processing unit may determine that the first communications apparatus is the leader terminal apparatus.

In at least some embodiments, if the first information includes an upper-layer terminal identifier of the first communications apparatus, when determining that the upper-layer terminal identifier of the first communications apparatus is the same as an upper-layer terminal identifier of the leader terminal apparatus, the processing unit may determine that the first communications apparatus is the leader terminal apparatus.

In at least some embodiments, the transceiver unit may further receive second information from an upper layer of the first communications apparatus by using an upper layer of the second communications apparatus, where the second information is used to indicate the upper-layer terminal identifier of the leader terminal apparatus in the terminal apparatus group. The transceiver unit may further indicate the upper-layer terminal identifier of the leader terminal apparatus to the AS of the second communications apparatus by using the upper layer of the second communications apparatus.

In at least some embodiments, the second information includes one or more of the following information: the upper-layer terminal identifier of the first communications apparatus (may include the V2X layer identifier, an identifier of a layer above a V2X layer, or the V2X layer identifier and an identifier of a layer above a V2X layer), information used to indicate that the upper-layer terminal identifier is an identifier of the leader terminal apparatus in the terminal apparatus group, a group ID of the terminal apparatus group, an identifier of a member terminal in the terminal apparatus group, or information used to indicate a quantity of member terminals in the terminal apparatus group.

In at least some embodiments, the transceiver unit may further receive, by using the upper layer of the second communications apparatus, the second information from the upper layer of the first communications apparatus in an authentication process between the first communications apparatus and the second communications apparatus, a group creation process, a group member joining process, or a discovery process.

In at least some embodiments, the first information may be carried in an RRC message (for example, an RRC reconfiguration message), a physical layer message (for example, SCI or DCI), or a media access control layer MAC message (for example, a MAC control element CE message).

In at least some embodiments, the second information may be carried in any one of the following messages: a message used to request to set up an SL, a message used to indicate that an SL setup request is accepted, a message used to request to maintain an SL connection, or a message used to indicate that maintaining an SL connection is accepted, where the SL is an upper-layer link between the first communications apparatus and the second communications apparatus.

In at least some embodiments, the transceiver unit may further receive a logical channel ID from the AS of the first communications apparatus by using the AS of the second communications apparatus, where the logical channel ID is used to indicate whether the message carries an AS message; or the transceiver unit may further receive an AS message indication from the AS of the first communications apparatus by using the AS of the second communications apparatus, where the AS message indication is used to indicate whether the message carries an AS message.

In at least some embodiments, the AS identifier of the first communications apparatus may include a physical layer identifier of the first communications apparatus. In an embodiment, the physical layer identifier of the first communications apparatus may include at least one of the following identifiers: a cell radio network temporary identifier C-RNTI of the first communications apparatus, a CS-RNTI of the first communications apparatus, an interruption radio network temporary identifier INT-RNTI of the first communications apparatus, a paging radio network temporary identifier P-RNTI of the first communications apparatus, a system information radio network temporary identifier SI-RNTI of the first communications apparatus, a semi-persistent channel state information radio network temporary identifier SP-CSI-RNTI of the first communications apparatus, a random access radio network temporary identifier RA-RNTI of the first communications apparatus, a temporary cell radio network temporary identifier temporary C-RNTI of the first communications apparatus, an inactive radio network temporary identifier I-RNTI of the first communications apparatus, a layer 1 source identifier of the first communications apparatus, or a layer 1 destination identifier of the first communications apparatus.

In at least some embodiments, the V2X layer identifier of the first communications apparatus may include a layer 2 identifier of the first communications apparatus. In an embodiment, the layer 2 identifier of the first communications apparatus may include a layer 2 source identifier of the first communications apparatus or a layer 2 destination identifier of the first communications apparatus.

In at least some embodiments, the first information may include information used to indicate that the first communications apparatus is the leader terminal apparatus in the terminal apparatus group.

In at least some embodiments, the first information may be carried in any one of the following messages: an AS groupcast message, an AS broadcast message, a PC5-RRC connection setup request message, a PC5-RRC connection setup message, a PC5-RRC connection reconfiguration message, a terminal capability reporting message, terminal assistance information, sidelink terminal information, a buffer status report, a message used to request to set up an SL, a message used to indicate that an SL setup request is accepted, or a message used to indicate configuration information of an SL, where the SL is an AS link between the first communications apparatus and the second communications apparatus.

In at least some embodiments, the first information may include one or more of the following information: the information used to indicate that the first communications apparatus is the leader terminal apparatus in the terminal apparatus group, a group ID of the terminal apparatus group, an identifier of a member terminal in the terminal apparatus group, or information used to indicate a quantity of member terminals in the terminal apparatus group.

In at least some embodiments, the first information includes AS groupcast groupcast configuration information of the SL.

In at least some embodiments, if the second communications apparatus is a network device, the transceiver unit may further send fifth information to a third communications apparatus, where the fifth information is used to indicate that the third communications apparatus is not allowed to forward and schedule a resource configuration to another communications apparatus, and the third communications apparatus and the another communications apparatus are terminal apparatuses in the terminal apparatus group. The network device may further send indication information to a leader terminal, where the indication information is used to indicate that the leader terminal is allowed to forward, schedule, or both forward and schedule the resource configuration to the member terminal in the terminal apparatus group, or the indication information is used to indicate that the leader terminal is not allowed to forward, schedule, or is not allowed both forward and schedule the resource configuration to the member terminal in the terminal apparatus group.

In at least some embodiments, to perform functions by the first communications apparatus, the transceiver unit may be configured to send SL AS groupcast groupcast configuration information to a second communications apparatus, where the first communications apparatus and the second communications apparatus belong to a same terminal apparatus group, and the AS groupcast groupcast configuration information is used by the second communications apparatus to configure an SL AS groupcast parameter.

In at least some embodiments to perform functions by the second communications apparatus, the transceiver unit may receive SL AS groupcast groupcast configuration information from a first communications apparatus, where the first communications apparatus and the second communications apparatus belong to a same terminal apparatus group, and the SL AS groupcast groupcast configuration information is used by the second communications apparatus to configure an SL AS groupcast parameter.

In at least some embodiments, the communications apparatus may include a transceiver, a memory, and a processor, where the transceiver is used by the communications apparatus to perform communication; the memory is configured to store program instructions; and the processor is configured to invoke and run the program instructions from the memory, to perform functions by the first communications apparatus or the second communications apparatus. In at least some embodiments, the transceiver may be configured to perform functions implemented by the transceiver unit. The processor may be configured to perform functions implemented by the processing unit.

An embodiment of the application provides a computer-readable storage medium, including program instructions, where when the program instructions are run on a computer, the computer is enabled to perform the methods by the first communications apparatus or the second communications apparatus according to embodiments described herein.

An embodiment of the application provides a computer program product, where when the computer program product runs on a computer, the computer is enabled to perform the methods by the first communications apparatus or the second communications apparatus according to embodiments described herein.

An embodiment of the application provides a system chip. The system chip may include a processor, and may further include a memory (or the system chip is coupled to the memory), and the system chip executes program instructions in the memory, to perform the methods according to embodiments as described herein. "Be coupled to" means that two components are directly or indirectly combined with each other. For example, "be coupled to" may mean that the two components are electrically connected.

For example, the first communications apparatus and the second communications apparatus in the application may be two terminal devices in a communications system, for example, a V2X system, or may be system chips or chip apparatuses in the terminal device. The system chip or the chip apparatus may have a structure and a function of the system chip according embodiments as described herein.

DESCRIPTION OF EMBODIMENTS

Figure 1:
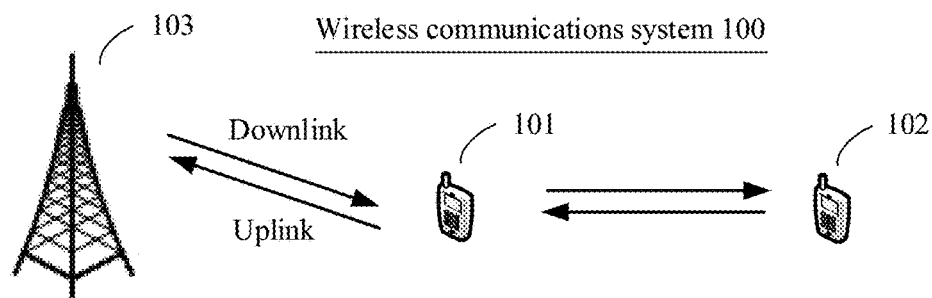
FIG. 1 is a schematic architectural diagram of a wireless communications system according to an embodiment of the application.

To make objectives, technical solutions, and advantages of the application clearer, the following further describes the application in detail with reference to the accompanying drawings. A method embodiment may also be used in an apparatus embodiment or a system embodiment.

Terms in the application are explained below:

1. At least one means one or more, that is, including one, two, three, or more.

2. A plurality of means two or more, that is, including two, three, or more.

3. Carrying may mean that a message is used to carry information or data, or may mean that a message includes information.

4. A sidelink (SL) is used for device-to-device (D2D) communication between terminals.

5. A terminal apparatus group in the application refers to a set of a plurality of terminal apparatuses configured to perform a group-related service. For example, a plurality of terminals in one or more cells may form one terminal apparatus group, and a possible form is a platoon. A terminal in the terminal apparatus group may communicate with another terminal in a groupcast, unicast, or broadcast manner. The terminal apparatus group has a unique group identifier (ID) that may be used to identify the terminal apparatus group.

6. Sidelink unicast means that a terminal transmits information to another terminal. Sidelink multicast means that a terminal transmits information to a plurality of terminals. Sidelink broadcast means that a terminal transmits information to all terminals within coverage of the terminal.

7. A leader terminal in the application is a terminal that is specified by a core network, another network device (e.g., a base station), or some terminal apparatuses and that is in the terminal apparatus group. The terminal may be configured to perform group management, for example, manage a member terminal in the terminal apparatus group, or newly join or remove a member terminal in the terminal apparatus group. The leader terminal may also be configured to collect a transmission resource requirement of another terminal in the terminal apparatus group, and uniformly request a transmission resource from a network device. The transmission resource herein may be a transmission resource used to perform the group-related service. The core network may authorize, over an air interface by using higher layer signaling, a terminal in the terminal apparatus group as the leader terminal, and a higher layer (for example, an application layer) of the terminal may determine, based on the higher layer signaling, that the terminal is the leader terminal. A terminal other than the leader terminal in the terminal apparatus group may be referred to as a member terminal or a member terminal apparatus.

8. A terminal identifier (ID) is identification information used to uniquely identify a terminal apparatus. Based on division of a protocol layer structure of the terminal apparatus, the terminal apparatus may have one or more identifiers. For example, when a protocol layer of the terminal apparatus includes an upper layer (for example, an application layer), a vehicle-to-everything (V2X) layer, and an access stratum (AS), the terminal apparatus may respectively have an upper-layer identifier (or referred to as an upper-layer terminal identifier), a V2X layer identifier (or referred to as a V2X layer terminal identifier), and an AS identifier (or referred to as an AS terminal identifier). The V2X layer may be a protocol layer located between the upper layer (for example, the application layer) and the AS. It should be understood that the application layer is used as an example in the application to describe the upper layer, but it should not be understood that the upper layer refers only to the application layer.

The AS may include a layer 1 (L1) (e.g., a physical layer). Therefore, the AS identifier may include a physical layer identifier, for example, includes at least one of the following identifiers: a cell radio network temporary identifier (C-RNTI), a configured scheduling radio network temporary identifier (configured scheduling RNTI, CS-RNTI), an interruption radio network temporary identifier (interruption RNTI, INT-RNTI), a paging radio network temporary identifier (paging RNTI, P-RNTI), and a system information radio network temporary identifier (system information RNTI, SI-RNTI), a semi-persistent channel state information radio network temporary identifier (semi-persistent channel state information RNTI, SP-CSI-RNTI), a temporary cell radio network temporary identifier (temporary C-RNTI), an inactive radio network temporary identifier (inactive-RNTI, I-RNTI), a layer 1 source identifier (L1 source ID, or source L1 ID), or a layer 1 destination identifier (L1 destination ID, or destination L1 ID).

In the application, a layer 2 identifier, for example, a layer 2 source identifier (L2 source ID, or source L2 ID), a layer 2 destination identifier (L2 destination ID, or destination L2 ID), or a layer 2 source identifier (L2 source ID, or source L2 ID) and a layer 2 destination identifier (L2 destination ID, or destination L2 ID) of a terminal may be used as a V2X layer identifier of the terminal. It should be understood that, for the AS, the upper layer may include the V2X layer and another layer above the V2X layer, for example, the application layer.

9. Group communication is a process in which a terminal in the terminal apparatus group communicates with one or more other terminals in a same terminal apparatus group, or a terminal in the terminal apparatus group transmits information to another terminal that is not in the group. The terminal may perform the group-related service in any one or more manners of unicast, groupcast, or broadcast.

The following describes the embodiments of the application in detail with reference to the accompanying drawings. First, a wireless communications system provided in the embodiments of the application is described. A terminal apparatus identification method provided in the application may be applied to the system. Then, the terminal apparatus identification method provided in the embodiments of the application is described. Finally, the terminal and the network device provided in the embodiments of the application are described.

As shown in FIG. 1, a wireless communications system 100 provided in an embodiment of the application includes a terminal 101, a terminal 102, and a network device 103. An application scenario of the wireless communications system 100 includes but is not limited to: a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system, a new radio (NR) communications system, an NR vehicle-to-everything system, or a future mobile communication-based vehicle-to-everything system. It should be understood that the wireless communications system 100 provided in an embodiment of the application is applicable to a low frequency scenario (sub 6G) and also applicable to a high frequency scenario (above 6G).

For example, the terminal 101 or the terminal 102 may be a device such as a terminal, a mobile station (MS), or a mobile terminal, or an apparatus such as a chip or a chip system. The terminal 101 can communicate with one or more network devices in one or more communications systems, and accept a network service provided by the network device. The network device herein includes but is not limited to the network device 103 shown in the figure. For example, the terminal 101 or the terminal 102 in an embodiment of the application may be a mobile phone (or referred to as a "cellular" phone), a computer having a mobile terminal, or the like. The terminal 101 or the terminal 102 may alternatively be a portable, pocket-sized, handheld, computer built-in, or in-vehicle mobile apparatus. The terminal 101 or the terminal 102 may alternatively be a communications chip having a communications module. It should be understood that the terminal 101 may be configured to support communication with the network device 103 over a universal user to network interface (Uu interface), the terminal 101 and the terminal 102 may be configured to support sidelink transmission, or the terminal 101 may be configured to support communication with the network device 103 over a universal user to network interface and the terminal 101 and the terminal 102 may be configured to support sidelink transmission. For example, the terminal 101 and the terminal 102 may perform sidelink communication over a direct communication (PC5) interface (e.g., an air interface used for sidelink communication between terminals).

The network device 103 may include a base station (BS), or include a base station, a radio resource management device configured to control the base station, and the like. The base station herein may be a base transceiver station (BTS) in a GSM or CDMA system, or may be a NodeB (NodeB, NB) in a WCDMA system, or may be an evolved NodeB (Evolutional NodeB, eNB or eNodeB), a micro/pico eNB, or a transmission/reception point (TRP) in an LTE system, or may be a radio controller in a cloud radio access network (CRAN) scenario. Alternatively, the base station 200 may be a relay station, an access point, a vehicle-mounted device, a wearable device, a base station in a future 5G network, a base station in a future evolved PLMN network, or the like, for example, an NR base station. This is not limited in an embodiment of the application.

Figure 2:
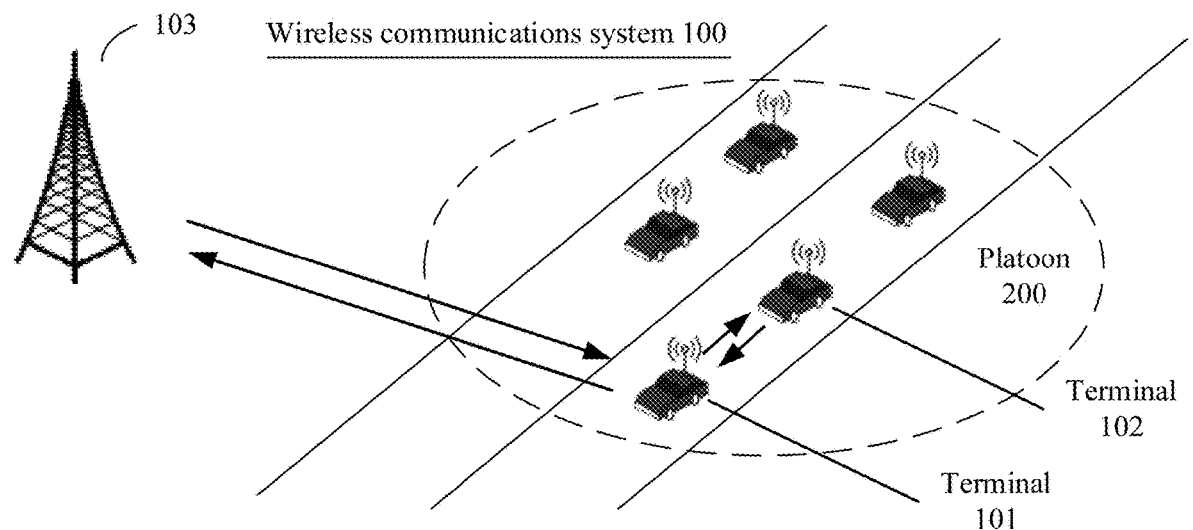
FIG. 2 is a schematic architectural diagram of another wireless communications system according to an embodiment of the application.

The following uses a V2X scenario shown in FIG. 2 as an example to further describe the application scenario of the wireless communications system 100 provided in an embodiment of the application.

As shown in FIG. 2, the wireless communications system 100 is applicable to a wireless communications system including a platoon 200. The platoon 200 includes a plurality of terminals (for example, in-vehicle mobile apparatuses). The platoon 200 may be a terminal apparatus group. The terminal 101 is a leader terminal in the platoon 200, and the terminal 102 is a terminal other than the leader terminal in the platoon 200. Therefore, in the application, the terminal 101 may request a transmission resource from the network device 103, and the transmission resource may be used by the terminal 101, another terminal in the platoon 200, or the transmission resource may be used by the terminal 101 and another terminal in the platoon 200 to perform a group-related service. The another terminal in the platoon 200 may send assistance information to the terminal 101. For example, the terminal 102 shown in FIG. 2 may send a requirement of the terminal 102 for the transmission resource to the terminal 101, so that the terminal 101 requests the transmission resource from the network device 103 based on the requirement of the terminal 102 for the transmission resource.

Figure 3:
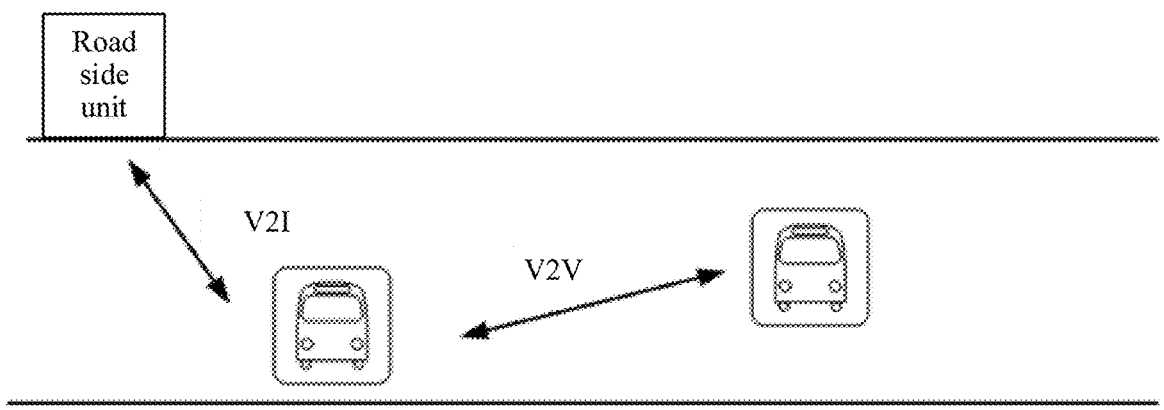
FIG. 3 is a schematic architectural diagram of another wireless communications system according to an embodiment of the application.

As shown in FIG. 3, in the V2X scenario, the wireless communications system may further include a road side unit (RSU) and at least one terminal. Vehicle-to-infrastructure (V2I) communication may be implemented between the road side unit and the terminal, and vehicle-to-vehicle (V2V) communication may be implemented between the terminals.

Figure 4:
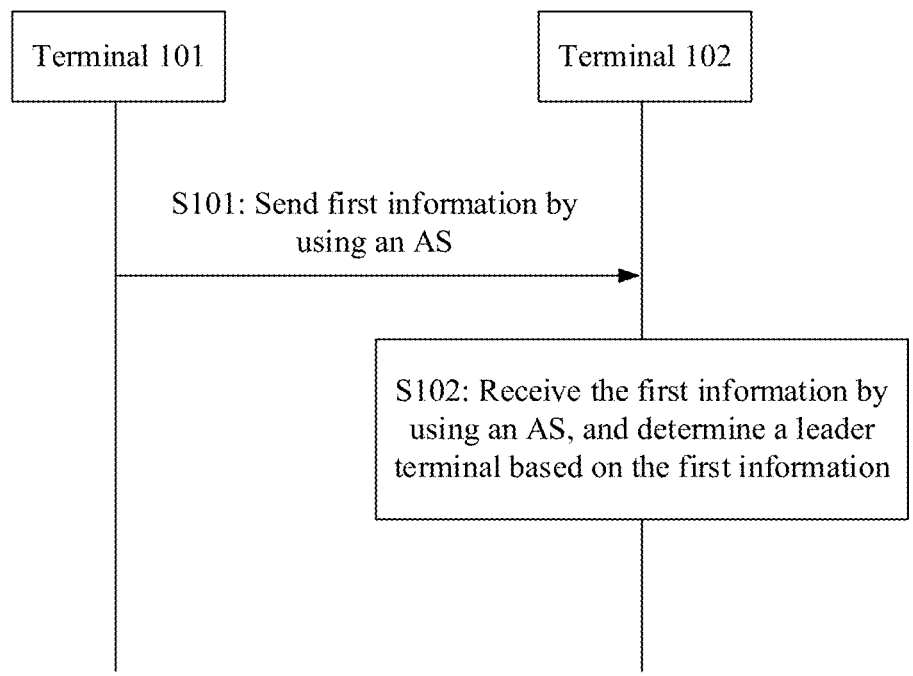
FIG. 4 is a schematic flowchart of a terminal apparatus identification method according to an embodiment of the application.

With reference to FIG. 4, the following describes a terminal apparatus identification method provided in an embodiment of the application by using the wireless communications system 100 shown in FIG. 2 as an example. The terminal 101 is the leader terminal in the platoon 200, and the terminal 102 is a non-leader terminal in the platoon 200. That is, the terminal 101 and the terminal 102 belong to a same terminal apparatus group (where the terminal apparatus group is the platoon 200). The terminal apparatus identification method may include the following operations.

S101: An AS of the terminal 101 sends first information to an AS of the terminal 102. The first information may be used to determine that the terminal 101 is the leader terminal in the terminal apparatus group.

S102: The AS of the terminal 102 receives the first information, and determines, based on the first information, that the terminal 101 is the leader terminal apparatus in the terminal apparatus group.

By using the foregoing method, the terminal 101 in the terminal apparatus group sends the first information to the terminal 102 by using the AS, so that the terminal 102 determines, based on the first information, that the terminal 101 is the leader terminal in the terminal apparatus group, thereby implementing AS identification of the leader terminal.

It should be understood that, in the operations described in FIG. 4, the terminal 101 is the leader terminal in the platoon 200. For example, before the operation described in S101, the terminal 101 may become the leader terminal in the platoon 200 based on authorization of a core network. The core network may select the leader terminal from the platoon 200 by considering one or more information such as location information, path loss information, and signal strength of each terminal in the platoon 200, and a remaining oil amount or a remaining electricity amount of a vehicle in which the terminal is located.

In at least some embodiments, the first information in the application may include a mapping relationship between an upper-layer identifier of the terminal 101 and an AS identifier of the terminal 101. For example, the AS identifier of the terminal 101 may be a physical layer identifier of the terminal 101, for example, may be a C-RNTI, a CS-RNTI, an INT-RNTI, a P-RNTI, an SI-RNTI, an SP-CSI-RNTI, a temporary C-RNTI, an I-RNTI, a layer 1 source identifier, or a layer 1 destination identifier of the terminal 101. The upper-layer identifier of the terminal 101 may be a terminal identifier of a layer above the AS of the terminal 101. For example, the upper-layer identifier of the terminal 101 includes a V2X layer identifier of the terminal 101, an identifier of a layer above a V2X layer, or a V2X layer identifier of the terminal 101 and an identifier of a layer above a V2X layer.

In an embodiment, the terminal 101 may include the upper-layer identifier and the AS identifier in a same message, to indicate that there is a mapping relationship between the upper-layer identifier and the AS identifier. Alternatively, the terminal 101 may indicate the upper-layer identifier and the AS identifier to the terminal 102 by using another message, and indicate the mapping relationship between the upper-layer identifier and the AS identifier by using the first information. For example, the terminal 101 indicates a plurality of upper-layer identifiers and a plurality of AS identifiers to the terminal 102, and indicates a mapping relationship between one of the upper-layer identifiers and one of the AS identifiers by using the first information.

The first information may further include a mapping relationship between the upper-layer identifier of the terminal 101 and the V2X layer identifier of the terminal 101. The V2X layer identifier of the terminal 101 may be a layer 2 identifier of the terminal 101, for example, a layer 2 source identifier, a layer 2 destination identifier of the terminal 101, or a layer 2 source identifier and a layer 2 destination identifier of the terminal 101. In this case, the upper-layer identifier of the terminal 101 may be an upper-layer (for example, an application layer) identifier of the V2X layer of the terminal 101.

In an embodiment, the terminal 101 may include the upper-layer identifier and the V2X layer identifier in a same message, to indicate that there is a mapping relationship between the upper-layer identifier and the V2X layer identifier. Alternatively, the terminal 101 may indicate the upper-layer identifier and the V2X layer identifier to the terminal 102 by using another message, and indicate the mapping relationship between the upper-layer identifier and the V2X layer identifier by using the first information. For example, the terminal 101 indicates a plurality of upper-layer identifiers and a plurality of V2X layer identifiers to the terminal 102, and indicates a mapping relationship between one of the upper-layer identifiers and one of the V2X layer identifiers by using the first information.

In addition, the first information may further include only the upper-layer terminal identifier of the terminal 101, for example, the V2X layer identifier, an identifier of a layer (for example, the application layer) above the V2X layer of the terminal 101, or the V2X layer identifier and an identifier of a layer (for example, the application layer) above the V2X layer of the terminal 101.

In an embodiment, the upper layer (the V2X layer or the layer above the V2X layer) of the terminal 101 may further send second information to an upper layer of the terminal 102, where the second information may be used to indicate an upper-layer identifier of the leader terminal in the terminal apparatus group (for example, a V2X layer identifier of the leader terminal, the identifier of the layer above the V2X layer, or a V2X layer identifier of the leader terminal and the identifier of the layer above the V2X layer), and the terminal 102 belongs to the terminal apparatus group. Therefore, the upper layer of the terminal 102 may determine the upper-layer identifier of the leader terminal based on the second information, and indicate the upper-layer identifier of the leader terminal to the AS of the terminal 102. After the AS of the terminal 102 receives the first information, the terminal 102 may determine an AS identifier of the leader terminal based on the first information and the upper-layer identifier of the leader terminal.

For a case in which the upper-layer identifier that is of the terminal 101 and that is indicated by the second information includes the V2X layer identifier or the identifier of the layer above the V2X layer, the following describes a method for identifying the leader terminal by the AS of the terminal 102.

First, if the upper-layer identifier that is of the terminal 101 and that is indicated by the second information includes the V2X layer identifier, the upper layer (including the V2X layer or the layer above the V2X layer) of the terminal 102 may determine a V2X layer identifier of the leader terminal based on the second information, and then the upper layer of the terminal 102 may notify the AS of the terminal 102 of the V2X layer identifier of the leader terminal. Because the AS of the terminal 102 can learn of the V2X layer identifier of the terminal 101 during AS interaction, the AS of the terminal 102 may identify, based on the V2X layer identifier of the leader terminal, whether the terminal 101 is the leader terminal.

Second, if the upper-layer identifier that is of the terminal 101 and that is indicated by the second information includes only an identifier of an upper layer (herein, the layer above the V2X layer), the upper layer of the terminal 101 may carry the second information in an upper-layer message in a process of interaction with the upper layer of the terminal 102, and send the second information to the upper layer of the terminal 102 by using the upper-layer message. For example, the upper layer of the terminal 101 may send the second information to the terminal 102 in an authentication process between the upper layer of the terminal 101 and the upper layer of the terminal 102, a group creation process, a group member joining process, or a discovery process.

After receiving the upper-layer message that carries the second information, the upper layer of the terminal 102 may determine the upper-layer identifier of the leader terminal based on the second information, and indicate the upper-layer identifier of the leader terminal to the AS of the terminal 102. Therefore, the AS of the terminal 102 may determine, based on the first information received from the AS of the terminal 101, whether the terminal 101 is the leader terminal.

The following separately describes several methods in which the AS of the terminal 102 determines, based on the first information, whether the terminal 101 is the leader terminal after learning of the upper-layer identifier of the leader terminal.

Method 1: If the first information sent by the AS of the terminal 101 to the AS of the terminal 102 includes the mapping relationship between the upper-layer identifier of the terminal 101 and the AS identifier of the terminal 101, the AS of the terminal 102 may determine the AS identifier of the leader terminal apparatus based on and the upper-layer identifier of the leader terminal and the mapping relationship that is between the upper-layer identifier and the AS identifier and that is indicated by the first information.

Method 2: If the first information includes the mapping relationship between the upper-layer identifier of the terminal 101 and the V2X layer identifier of the terminal 101, the AS of the terminal 102 may determine the V2X layer identifier of the leader terminal apparatus based on the upper-layer identifier of the leader terminal and the mapping relationship that is between the upper-layer identifier and the V2X layer identifier and that is indicated by the first information. Then, the AS of the terminal 102 may identify, based on the V2X layer identifier of the leader terminal, whether the terminal 101 is the leader terminal. If the V2X layer identifier of the terminal 101 is the same as the V2X layer identifier of the leader terminal, it indicates that the terminal 101 is the leader terminal.

Method 3: If the first information includes only the upper-layer identifier of the terminal 101, or in a leader terminal identification process, the AS of the terminal 102 parses only the upper-layer identifier carried in the first information, the AS of the terminal 102 may determine the upper-layer identifier of the terminal 101 based on the first information. After determining the upper-layer identifier of the leader terminal based on the second information, the upper layer of the terminal 102 may indicate the upper-layer identifier of the leader terminal to the AS of the terminal 102. If the AS of the terminal 102 identifies that the upper-layer identifier of the terminal 101 is the same as the upper-layer identifier of the leader terminal, it is determined that the terminal 101 is the leader terminal.

Third, if the second information indicates only the upper-layer identifier of the terminal 101, the V2X layer of the terminal 101 may carry the second information in a V2X layer message in a V2X layer interaction process with the terminal 102, and send the second information to the V2X layer of the terminal 102 by using the V2X layer message. Before this, an upper layer of the V2X layer of the terminal 101 may indicate, to the V2X layer of the terminal 101, that the terminal 101 is the leader terminal, indicate the upper-layer identifier of the leader terminal in the terminal apparatus group in which the terminal 101 is located, or both that the terminal 101 is the leader terminal and indicate the upper-layer identifier of the leader terminal in the terminal apparatus group in which the terminal 101 is located. An indication method may be indicating by using a value of a bit. For example, when the bit is set to 1 (or 0), it indicates that the terminal 101 is the leader terminal; otherwise, it indicates that the terminal 101 is not the leader terminal.

For example, if the terminal 101 initiates an SL setup process to the terminal 102, the V2X layer message may be a message, for example, an upper-layer SL communications request message, that is sent by the V2X layer of the terminal 101 to the V2X layer of the terminal 102 and that is used to request to set up an SL. If the terminal 102 initiates an SL setup process to the terminal 101, the V2X layer message may be a message, for example, an upper-layer SL communications acceptance message, that is sent by the V2X layer of the terminal 101 to the V2X layer of the terminal 102 and that indicates that an SL setup request is accepted. If an SL between the terminal 101 and the terminal 102 has been set up, the V2X layer message may be a message, for example, an SL communications connection maintaining message, that is sent by the V2X layer of the terminal 101 to the V2X layer of the terminal 102 and that is used to request to maintain an SL connection, or the V2X layer message may be a message, for example, a message for acknowledging SL communications connection maintaining, that is sent by the V2X layer of the terminal 101 to the V2X layer of the terminal 102 after the terminal 101 receives the message, sent by the terminal 102, used to request to maintain the SL connection and that indicates that maintaining an SL connection is accepted. The SL herein may be a V2X layer link between the terminal 101 and the terminal 102.

It should be understood that the V2X layer of the terminal 101 may send the V2X layer message according to a PC5-S protocol.

After receiving the V2X layer message that carries the second information, the V2X layer of the terminal 102 may determine the upper-layer identifier of the leader terminal based on the second information, and indicate the upper-layer identifier of the leader terminal to the AS of the terminal 102. Therefore, the AS of the terminal 102 may determine, based on the first information received from the AS of the terminal 101, whether the terminal 101 is the leader terminal. For example, whether the terminal 101 is the leader terminal may be separately identified based on the following three cases: the first information includes the mapping relationship between the upper-layer identifier of the terminal 101 and the AS identifier of the terminal 101, the first information includes the mapping relationship between the upper-layer identifier of the terminal 101 and the V2X layer identifier of the terminal 101, or the first information includes only the upper-layer identifier of the terminal 101. For an identification method, refer to the descriptions of the foregoing method 1, method 2, and method 3. Details are not described herein again.

It should be understood that, if the first information is set by using the foregoing method 1, to be more specific, the first information includes the mapping relationship between the upper-layer (the layer above the V2X layer herein) identifier of the terminal 101 and the AS identifier of the terminal 101, the terminal 101 may send the first information to the terminal 102 when the mapping relationship between the upper-layer identifier and the AS identifier changes, and the terminal 102 determines the AS identifier of the leader terminal based on the foregoing method, and stores the AS identifier of the leader terminal. Then, whether the AS message is from the leader terminal may be identified based on the AS identifier of the leader terminal.

If the first information is set by using the foregoing method 2, to be more specific, the first information includes the mapping relationship between the upper-layer identifier of the terminal 101 and the V2X layer identifier of the terminal 101, the terminal 101 may send the first information to the terminal 102 when the mapping relationship between the upper-layer identifier and the V2X layer identifier changes, and the terminal 102 determines the V2X layer identifier of the leader terminal based on the foregoing method, and stores the V2X layer identifier of the leader terminal. Then, whether the AS message is from the leader terminal may be identified based on the V2X layer identifier of the leader terminal. For example, the V2X layer identifier of the terminal 101 herein may be a layer 2 identifier of the terminal 101, for example, a layer 2 source identifier, a layer 2 destination identifier, or a layer 2 source identifier and a layer 2 destination identifier.

If the first information is set by using the foregoing method 3, to be more specific, the first information includes only the upper-layer identifier of the terminal 101, the terminal 101 may send the first information each time the terminal 101, served as the leader terminal, sends the AS message to the terminal 102. The terminal 102 needs to identify, based on the first information in the AS message each time, whether the AS message is from the leader terminal.

In an embodiment, the AS of the terminal 101 may further send either of a logical channel ID and an AS message indication to the AS of the terminal 102. In an embodiment, the logical channel ID or the AS message indication may be sent together with the first information by using a same AS message. The logical channel ID may be used to indicate whether the message carries the AS message. In an embodiment, a range of a logical channel ID that carries a message of a layer above the AS may be preconfigured, a range of a logical channel ID that carries the AS message may be preconfigured, or both a range of a logical channel ID that carries a message of a layer above the AS may be preconfigured and a range of a logical channel ID that carries the AS message may be preconfigured. In this way, the message may carry the logical channel ID that carries the message of the layer above the AS, to indicate that the message does not carry the AS message; or the message may carry the logical channel ID that carries the AS message, to indicate that the message carries the AS message. The AS message indication may also be used to indicate whether the message carries the AS message. The AS message indication may be a value of a bit. For example, when the value of the bit in a message sent by the AS of the terminal 101 is 1 (or 0), it may indicate that the message is used to carry the AS message; otherwise, when the value of the bit is 0 (or 1), it may indicate that the message does not carry the AS message.

Based on the logical channel ID or the AS message indication, if the AS of the terminal 102 determines that the message carries the AS message, the AS of the terminal 102 does not need to deliver the message to the upper layer of the AS for message processing. In this case, the AS of the terminal 102 may process the message. Otherwise, if the AS of the terminal 102 determines that the message does not carry the AS message, the AS of the terminal 102 needs to deliver the message to the upper layer of the AS for message processing.

It should be understood that the AS of the terminal 101 may include the logical channel ID or the AS message indication and the first information in a same message for sending, or the AS of the terminal 101 may separately send the first information and the logical channel ID by using a plurality of AS messages, or the AS of the terminal 101 may separately send the first information and the AS message indication by using a plurality of AS messages.

The second information in the foregoing embodiment may include one or more of the following information: the upper-layer identifier of the terminal 101 (may include the V2X layer identifier, an identifier of a layer above the V2X layer, or both the V2X layer identifier and an identifier of a layer above the V2X layer), information used to indicate that the upper-layer identifier is an identifier of the leader terminal apparatus in the terminal apparatus group, a group ID of the terminal apparatus group, an identifier of a member terminal in the terminal apparatus group, or information used to indicate a quantity of member terminals in the terminal apparatus group. The information used to indicate that the upper-layer identifier is the identifier of the leader terminal apparatus in the terminal apparatus group may be a value of a bit in the first information. For example, a value of a bit in the second information is 1 (or 0), it indicates that the upper-layer identifier indicated by the second information is the identifier of the leader terminal apparatus in the terminal apparatus group. The group ID of the terminal apparatus group may be used to indicate the terminal apparatus group to which the leader terminal apparatus belongs. If different terminal apparatus groups can be distinguished based on identifiers of terminals, the first information does not need to carry the group ID. The identifier of the member terminal in the terminal apparatus group may be used to indicate the member terminal in the terminal apparatus group. The information used to indicate a quantity of member terminals in the terminal apparatus group may be used to indicate the quantity of member terminals in the terminal apparatus group.

In an embodiment, after determining that the terminal 101 is the leader terminal, the AS of the terminal 101 may further send first indication information to the terminal 102 in the terminal apparatus group. The first indication information may be used to indicate that the terminal 102 is not allowed to forward, schedule, or both forward and schedule a resource configuration to another terminal. By using this design, the leader terminal may prohibit another terminal in the terminal apparatus group from forwarding, scheduling, or both forwarding and scheduling the resource configuration. In addition, the network device 103 may further send the first indication information to the terminal 102 in the terminal apparatus group, to prohibit the another terminal in the terminal apparatus group from forwarding, scheduling, or both forwarding and scheduling the resource configuration. The network device 103 may further send second indication information to the terminal 101, where the second indication information may be used to indicate that the terminal 101 is allowed to forward, schedule, or both forward and schedule the resource configuration to another terminal (for example, the terminal 102) in the terminal apparatus group. The first indication information, the second indication information, or both the first indication information and the second indication information may be represented by using a value of a bit. For example, when a value of a bit in the AS message is 1 (or 0), it indicates that a terminal that receives the AS message is not allowed to forward, schedule, or both forward and schedule the resource configuration to another terminal. When a value of a bit in the AS message is 0 (or 1), it indicates that the terminal that receives the AS message is allowed to forward, schedule, or both forward and schedule the resource configuration to another terminal.

For example, the first information may be carried in radio resource control (RRC), for example, an RRC reconfiguration message or another RRC message. The first information may alternatively be carried in a physical layer message. For example, when the terminal 101 sends the first information to the terminal 102, the first information may be carried in sidelink control information (SCI). When the terminal 101 sends the first information to the network device 103, the first information may be carried in downlink control information (DCI). In addition, the first information may also be carried in a media access control (MAC) layer message, for example, a MAC control element (CE) message.

Figure 5:
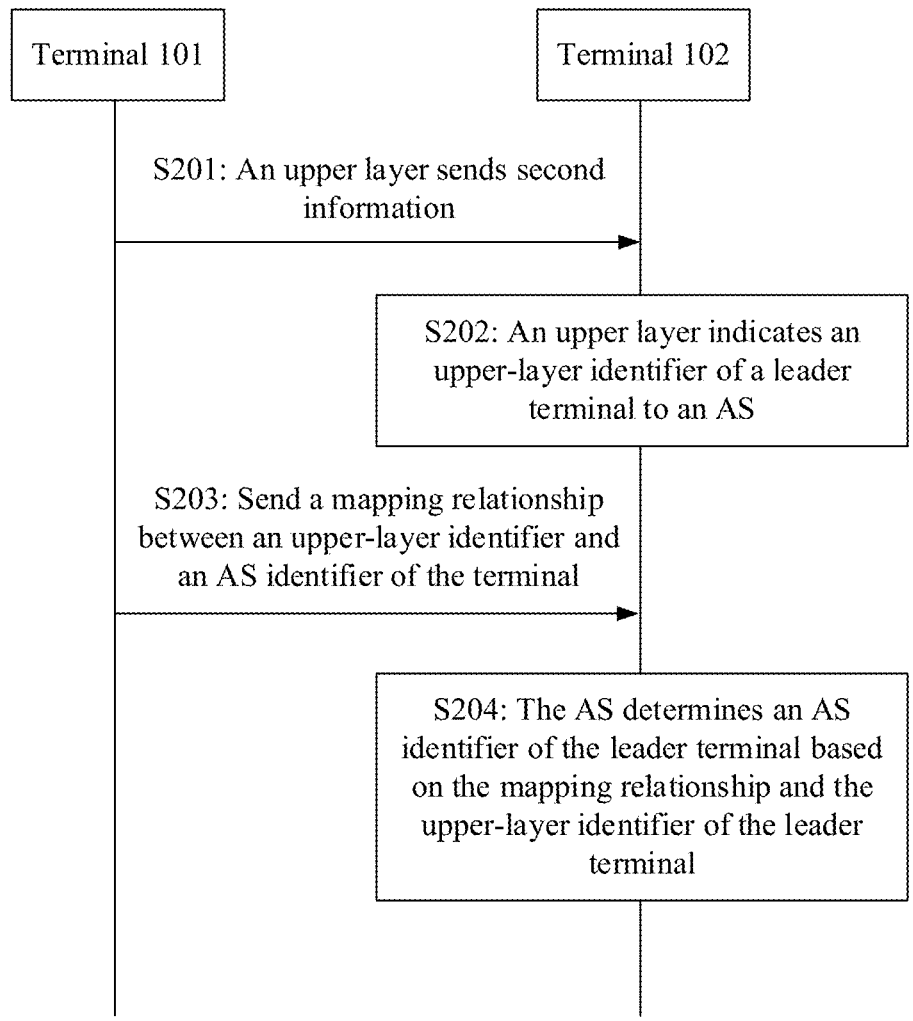
FIG. 5 is a schematic flowchart of a terminal apparatus identification method according to an embodiment of the application.

As shown in FIG. 5, a terminal apparatus identification method provided in an embodiment of the application may include the following operations.

S201: An upper layer (herein, a layer above a V2X layer) of a terminal 101 sends second information to an upper layer of a terminal 102, where the second information is used to indicate an upper-layer identifier of a leader terminal. The second information may include one or more of the following information: an upper-layer identifier of the terminal 101, information used to indicate that the upper-layer identifier is an identifier of the leader terminal, a group ID of a terminal apparatus group, an identifier of a member terminal in the terminal apparatus group, or information used to indicate a quantity of member terminals. The second information may be sent in an authentication process between the terminal 102 and the terminal 101, a group creation process, a group member joining process, or a discovery process of the terminal apparatus group. Based on the second information, the upper layer of the terminal 102 may learn of the upper layer identifier of the leader terminal.

S202: The upper layer of the terminal 102 indicates the upper-layer identifier of the leader terminal to an AS of the terminal 102.

S203: An AS of the terminal 101 sends a mapping relationship between the upper-layer identifier and an AS identifier of the terminal 101 to the AS of the terminal 102.

S204: The AS of the terminal 102 determines an AS identifier of the leader terminal based on the mapping relationship and the upper-layer identifier of the leader terminal.

Figure 6:
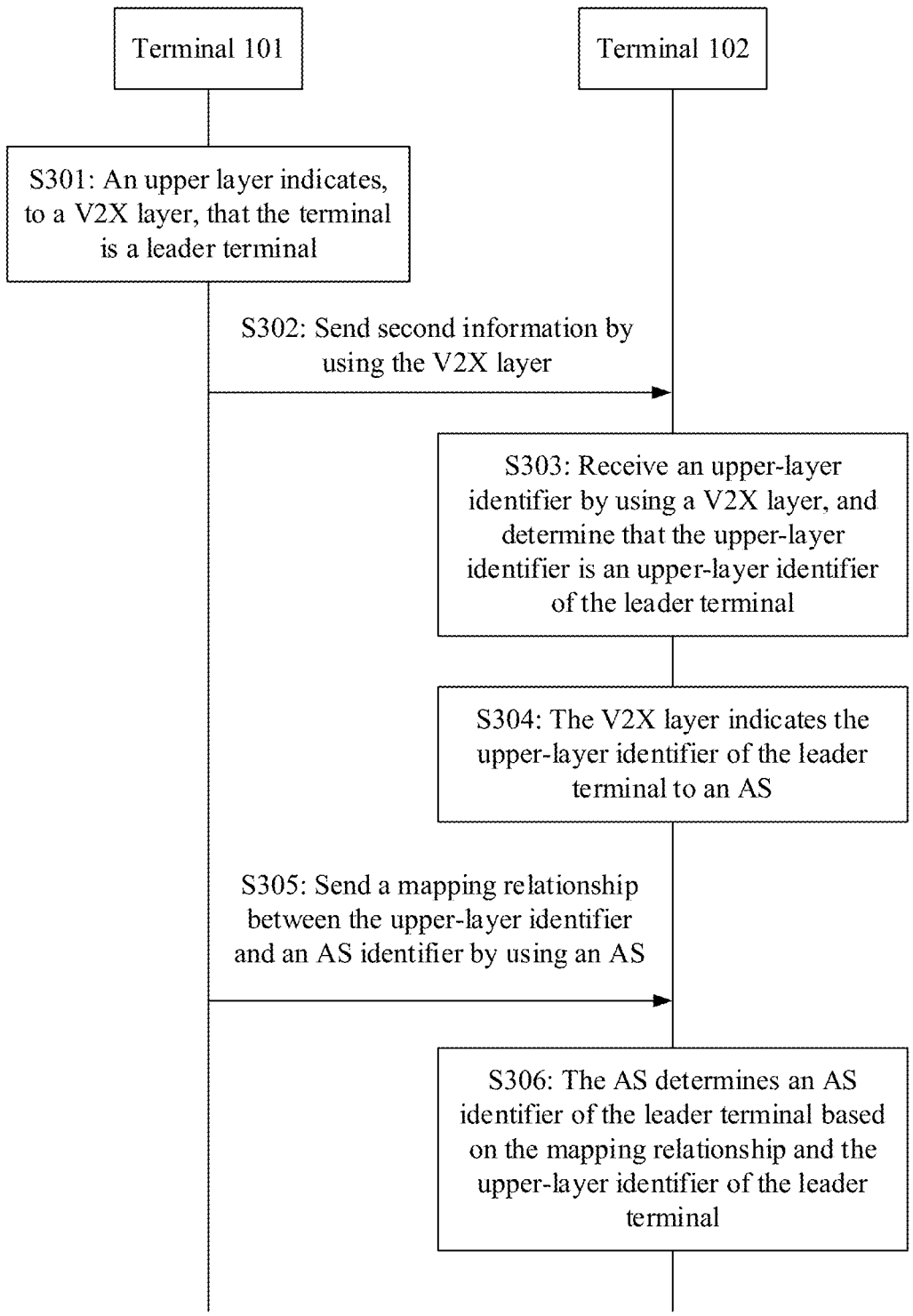
FIG. 6 is a schematic flowchart of another terminal apparatus identification method according to an embodiment of the application.

As shown in FIG. 6, a terminal apparatus identification method provided in an embodiment of the application may include the following operations.

S301: An upper layer (herein, a layer above a V2X layer) of a terminal 101 indicates, to a V2X layer of the terminal 101, that the terminal 101 is a leader terminal in a terminal apparatus group.

S302: The V2X layer of the terminal 101 sends second information to a V2X layer of a terminal 102, where the second information is used to indicate an upper-layer identifier of the leader terminal. The second information may include one or more of the following information: an upper-layer identifier of the terminal 101 (the upper-layer identifier herein may be a V2X layer identifier, an identifier of a layer above the V2X layer of the terminal 101, or both a V2X layer identifier and an identifier of a layer above the V2X layer of the terminal 101), information used to indicate that the upper-layer identifier is an identifier of the leader terminal, a group ID of the terminal apparatus group, an identifier of a member terminal in the terminal apparatus group, or information used to indicate a quantity of member terminals. The V2X layer of the terminal 101 may send the second information to the V2X layer of the terminal 102 in a process of setting up or maintaining an SL.

S303: The V2X layer of the terminal 102 receives the second information from the V2X layer of the terminal 101, so that the V2X layer of the terminal 102 may determine the upper-layer identifier of the leader terminal.

S304: The V2X layer of the terminal 102 indicates the upper layer identifier of the leader terminal to an AS of the terminal 102.

S305: An AS of the terminal 101 sends a mapping relationship between the upper-layer identifier and an AS identifier of the terminal 101 to the AS of the terminal 102.

S306: The AS of the terminal 102 determines an AS identifier of the leader terminal based on the mapping relationship and the upper-layer identifier of the leader terminal.

In another embodiment, the first information may be further used to indicate that the terminal 101 is the leader terminal in the terminal apparatus group, so that the AS of the terminal 102 can determine, based on the information, that the terminal 101 is the leader terminal, to implement leader terminal identification at the AS. Before this, the upper layer of the terminal 101 may indicate to the AS of the terminal 101 that the terminal 101 is the leader terminal.

For example, the first information may include information used to indicate that the terminal 101 is the leader terminal apparatus in the terminal apparatus group, for example, include a bit 0 or 1. The first information may further include the group ID of the terminal apparatus group, to identify the terminal apparatus group to which the leader terminal belongs. If different terminal apparatus groups can be distinguished based on identifiers of terminals, the first information does not need to carry the group ID. The first information may further include the identifier of the member terminal in the terminal apparatus group, the information used to indicate a quantity of member terminals in the terminal apparatus group, or the identifier of the member terminal in the terminal apparatus group and the information used to indicate a quantity of member terminals in the terminal apparatus group.

In addition, the first information may also implicitly indicate that the terminal 101 is the leader terminal apparatus in the terminal apparatus group. For example, when the first information includes AS groupcast configuration information of the SL (or referred to as SL AS groupcast configuration information), it indicates that the terminal 101 is the leader terminal apparatus in the terminal apparatus group. The AS groupcast configuration information of the SL may include one or more of the following information: the group ID of the terminal apparatus group, a resource configuration of the terminal apparatus group, or the identifier of the member terminal in the terminal apparatus group.

The terminal 101 may further indicate an AS groupcast configuration parameter to the terminal 102 by using the AS groupcast configuration information sent to the terminal 102.

For another example, the first information may be further used to indicate an SL resource pool. In this case, after determining that the first information indicates the SL resource pool, the AS of the terminal 102 may determine that the terminal 101 is the leader terminal. For example, the AS of the terminal 102 may further determine that the SL resource pool indicated by the first information is only used to perform a group-related service related to the terminal 101.

The first information may be carried in an AS groupcast message, an AS broadcast message, a message used to request to set up an SL connection, a message used to indicate that an SL connection setup request is accepted, or a message used to configure or reconfigure an SL connection that is sent by the AS of the terminal 101 to the AS of the terminal 102. The message used to request to set up an SL connection may be sent by the AS of the terminal 101 to the AS of the terminal 102, and may be used to request to set up an AS SL connection between the terminal 101 and the terminal 102. The message used to indicate that the SL connection setup request is accepted may be sent by the AS of the terminal 101 to the AS of the terminal 102 when receiving the message that is sent by the AS of the terminal 102 and that is used to request to set up an SL, and may be used to indicate to accept the request. The message used to indicate to configure or reconfigure the SL connection may be used to carry the AS configuration parameter of the SL between the terminal 101 and the terminal 102.

In addition, after determining that the terminal 101 is the leader terminal, the terminal 101 may further send fourth information to the terminal 102 or another terminal in the terminal apparatus group, where the fourth information is used to indicate that the terminal 102 or the another terminal in the terminal apparatus group is not allowed to forward and schedule a resource configuration, and the another terminal is a terminal apparatus in the terminal apparatus group to which the terminal 101 belongs.

Figure 7:
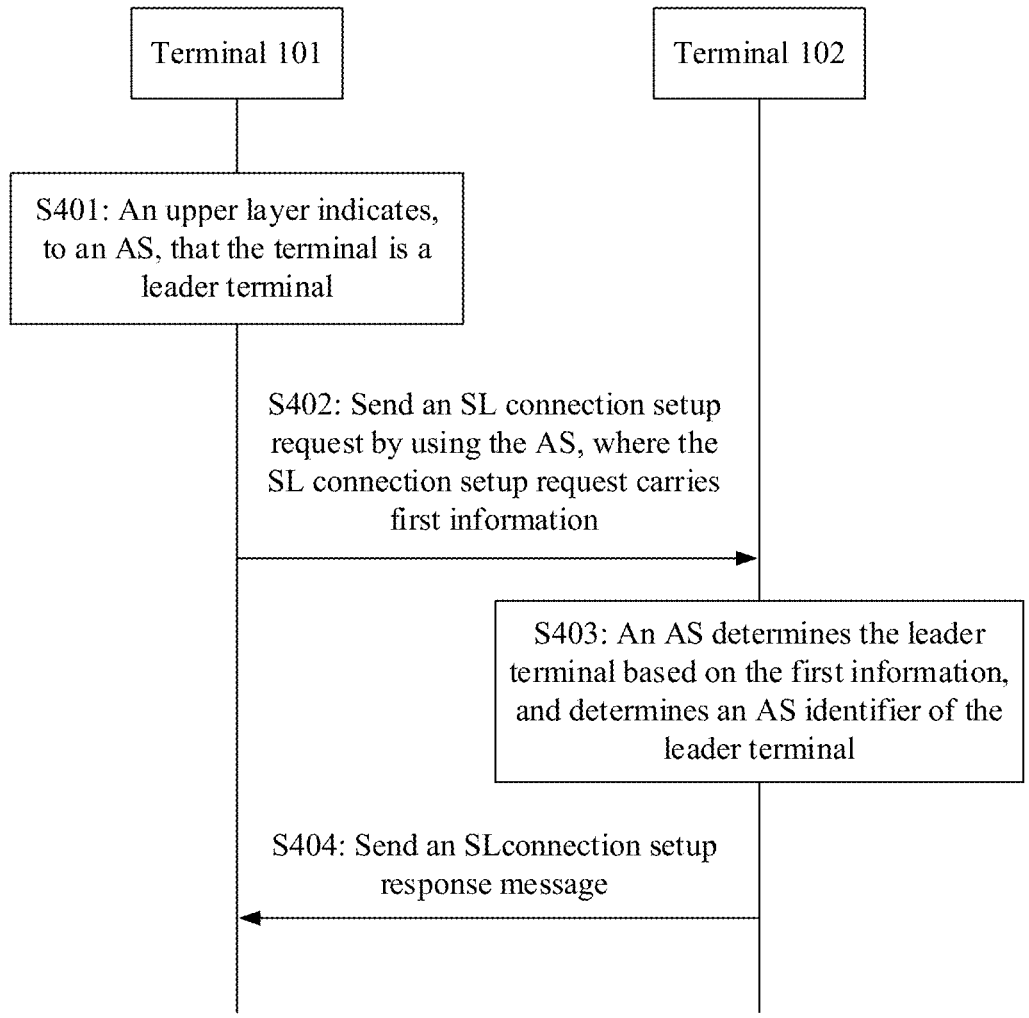
FIG. 7 is a schematic flowchart of another terminal apparatus identification method according to an embodiment of the application.

As shown in FIG. 7, a terminal apparatus identification method provided in an embodiment of the application may include the following operations.

S401: An upper layer of a terminal 101 indicates, to an AS, that the terminal 101 is a leader terminal.

S402: The AS of the terminal 101 sends an SL connection setup request to an AS of a terminal 102, where the SL connection setup request carries first information. The first information is used to indicate that the terminal 101 is the leader terminal in a terminal apparatus group, and the SL connection setup request is used to request to set up an AS SL connection between the terminal 101 and the terminal 102.

S403: The AS of the terminal 102 determines, based on the first information, that the terminal 101 is the leader terminal, determines that an AS identifier of the terminal 101 is an AS identifier of the leader terminal, or determines, based on the first information, that the terminal 101 is the leader terminal and that an AS identifier of the terminal 101 is an AS identifier of the leader terminal.

S404: After receiving the SL connection setup request, the AS of the terminal 102 sends an SL connection setup response message to the terminal 101, to indicate to accept or reject the request. The SL connection setup response message may be a message used to indicate that the SL connection setup request is accepted.

In addition, if the SL connection setup request is requested to be initiated by the terminal 102, to be more specific, the AS of the terminal 101 receives the SL connection setup request from the AS of the terminal 102, the AS of the terminal 101 may include the first information in the SL connection setup response message (for example, the message used to indicate that the SL connection setup request is accepted) sent to the AS of the terminal 102.

Figure 8:
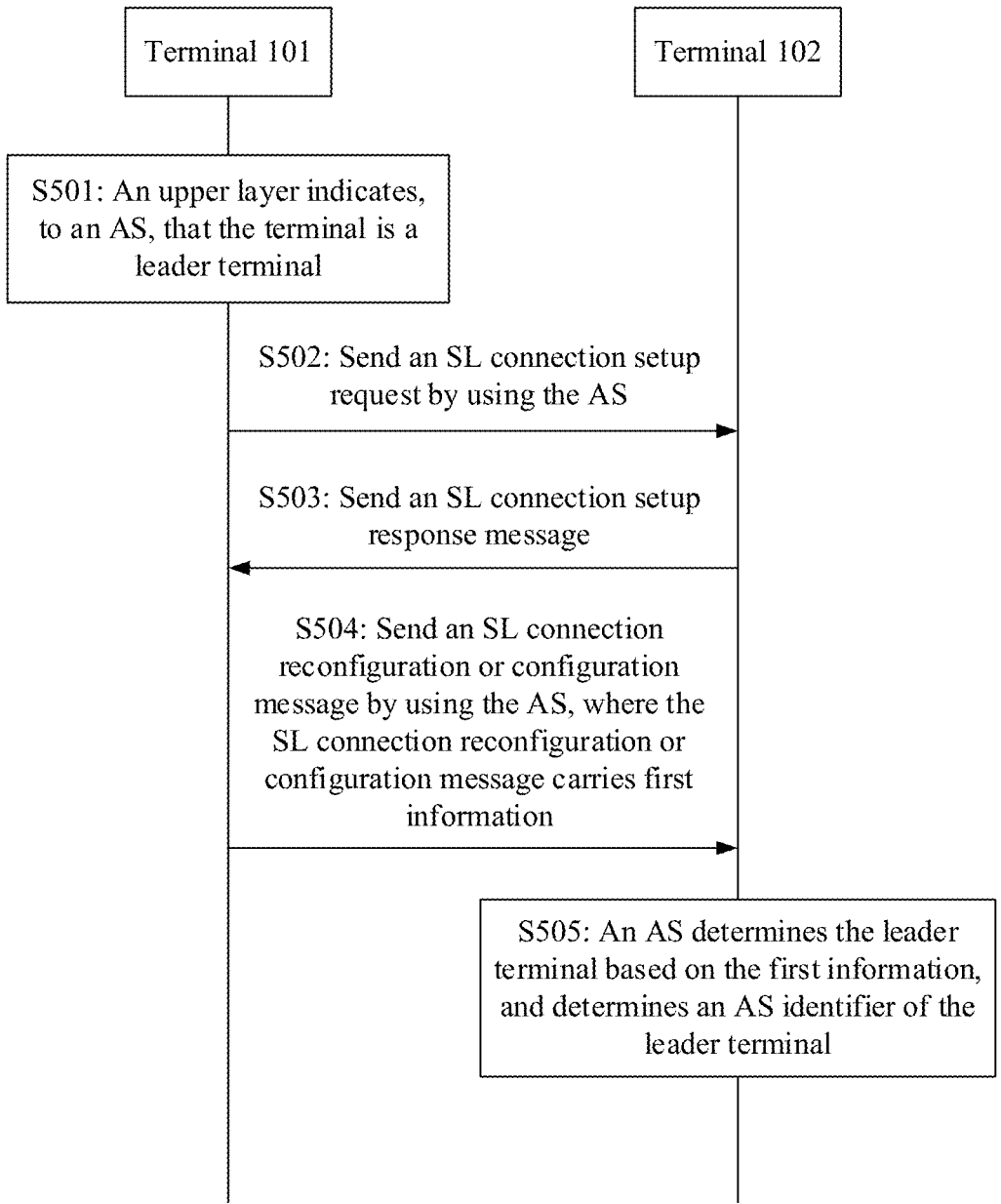
FIG. 8 is a schematic flowchart of another terminal apparatus identification method according to an embodiment of the application.

As shown in FIG. 8, a terminal apparatus identification method provided in an embodiment of the application may include the following operations.

S501: An upper layer of a terminal 101 indicates, to an AS, that the terminal 101 is a leader terminal.

S502: The AS of the terminal 101 sends an SL connection setup request to an AS of a terminal 102.

S503: After receiving the SL connection setup request, the AS of the terminal 102 sends an SL connection setup response message to the terminal 101, to indicate to accept the request. The SL connection setup response message may be a message used to indicate that the SL connection setup request is accepted.

S504: After an SL connection is set up, the AS of the terminal 101 sends an SL connection reconfiguration or configuration message to the AS of the terminal 102, where the SL connection reconfiguration or configuration message may be used to indicate configuration information of the SL connection, and the SL connection reconfiguration or configuration message carries first information. The first information is used to indicate that the terminal 101 is the leader terminal in a terminal apparatus group, or the first information is SL AS groupcast configuration information in the SL connection reconfiguration or configuration message.

S505: The AS of the terminal 102 determines, based on the first information, that the terminal 101 is the leader terminal, determines that an AS identifier of the terminal 101 is an AS identifier of the leader terminal, or determines, based on the first information, that the terminal 101 is the leader terminal and determines that an AS identifier of the terminal 101 is an AS identifier of the leader terminal.

Figure 9:
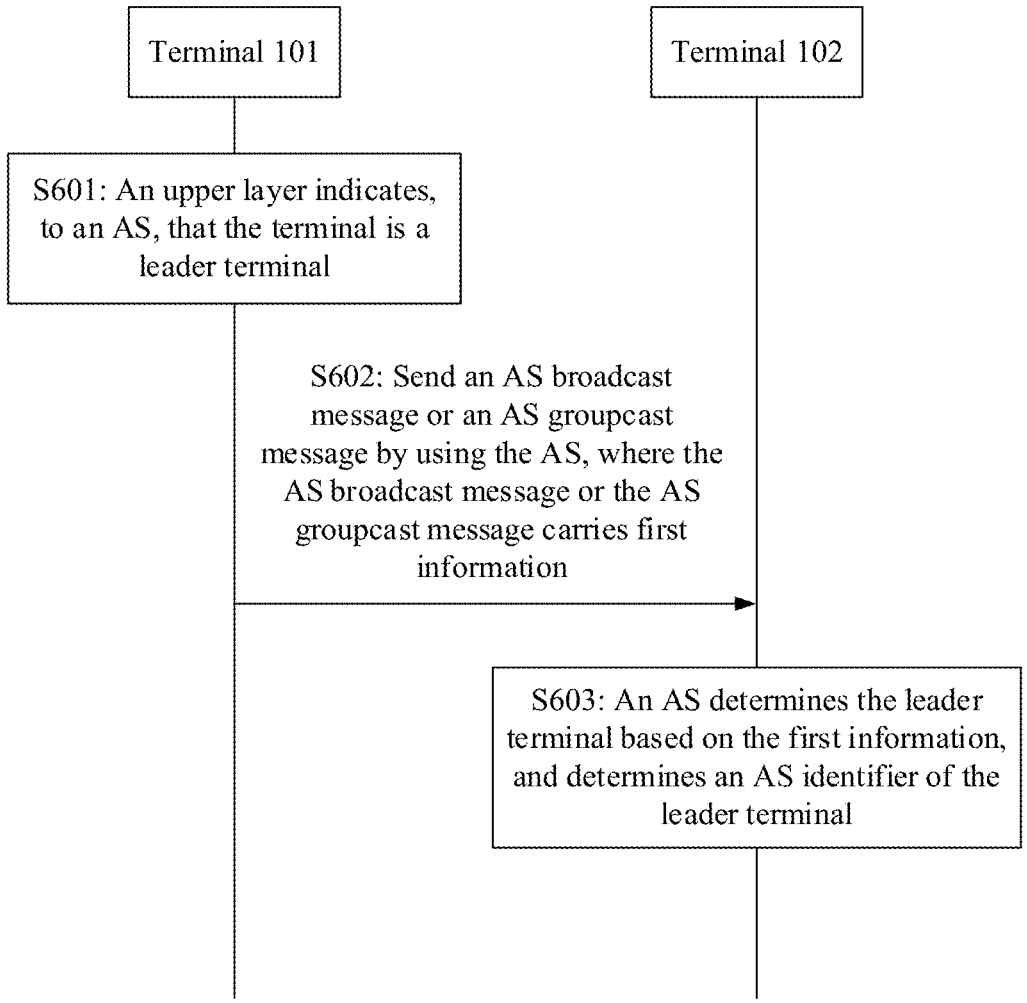
FIG. 9 is a schematic flowchart of another terminal apparatus identification method according to an embodiment of the application.

As shown in FIG. 9, a terminal apparatus identification method provided in an embodiment of the application may include the following operations.

S601: An upper layer of a terminal 101 indicates, to an AS, that the terminal 101 is a leader terminal.

S602: The AS of the terminal 101 sends first information to an AS of a terminal 102 by using an AS broadcast message or an AS groupcast message.

S603: The AS of the terminal 102 determines, based on the first information received from the AS of the terminal 101, that the terminal 101 is the leader terminal, determines that an AS identifier of the terminal 101 is an AS identifier of the leader terminal, or determines, based on the first information received from the AS of the terminal 101, that the terminal 101 is the leader terminal and determines that an AS identifier of the terminal 101 is an AS identifier of the leader terminal.

In addition, the AS of the terminal 101 may further send the first information to an AS of a network device 103 by using an RRC protocol message of a PC5 interface, such as a PC5-RRC connection setup request message, a PC5-RRC connection setup message, or a PC5-RRC connection reconfiguration message, or by using a terminal capability reporting message, terminal assistance information (UE assistance information), sidelink terminal information (sidelink UE information), or a buffer status report (BSR), so as to indicate, to the network device 103, that the terminal 101 is the leader terminal.

Figure 10:
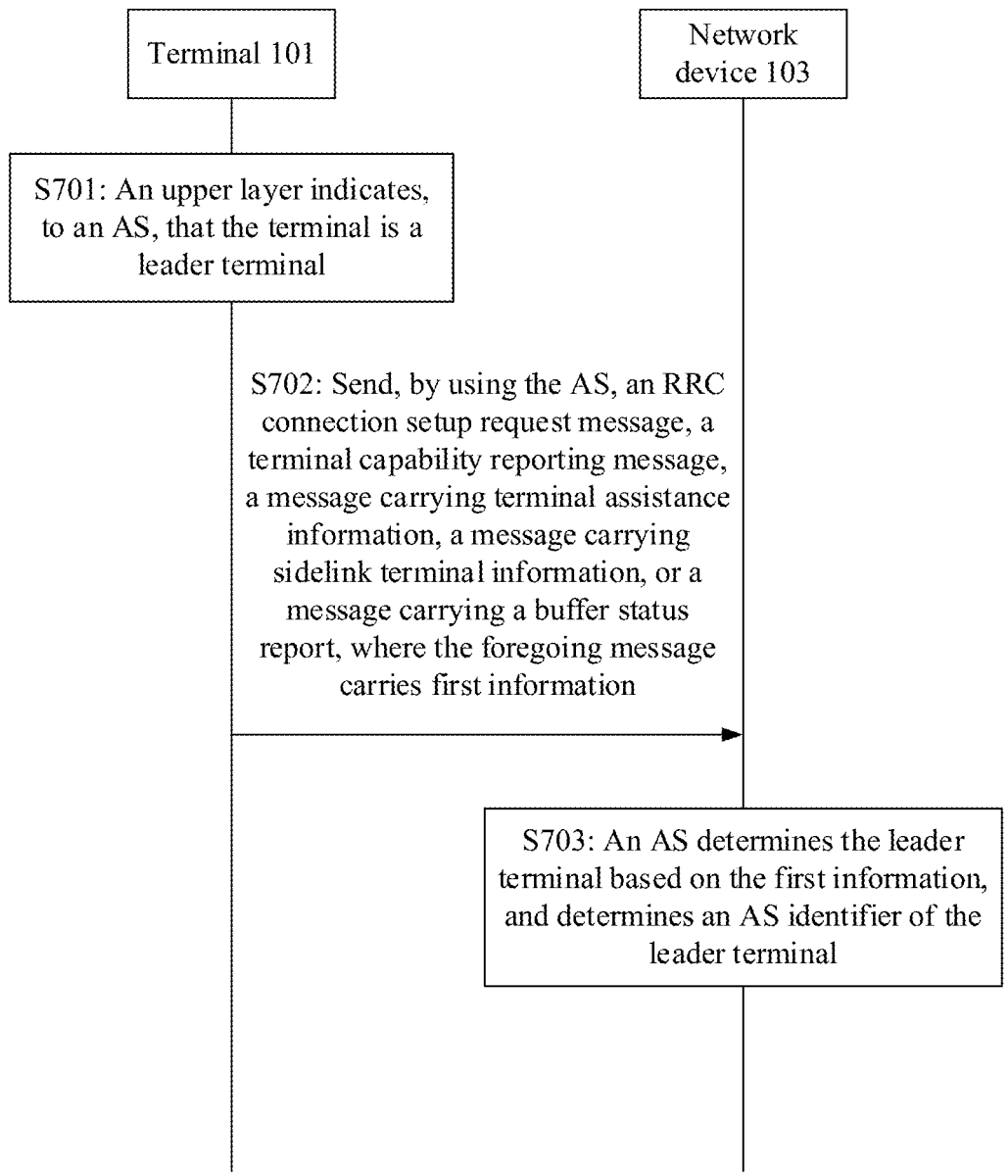
FIG. 10 is a schematic flowchart of another terminal apparatus identification method according to an embodiment of the application.

As shown in FIG. 10, a terminal apparatus identification method provided in an embodiment of the application may include the following operations.

S701: An upper layer of a terminal 101 indicates, to an AS, that the terminal 101 is a leader terminal.

S702: The AS of the terminal 101 sends one of an RRC connection setup request message, a terminal capability reporting message, UE assistance information, sidelink UE information, or a BSR to an AS of a network device 103, where the foregoing message carries first information.

S703: The AS of the network device 103 determines, based on the first information received from the AS of the terminal 101, that the terminal 101 is the leader terminal, determines that an AS identifier of the terminal 101 is an AS identifier of the leader terminal, or determines, based on the first information received from the AS of the terminal 101, that the terminal 101 is the leader terminal and determines that an AS identifier of the terminal 101 is an AS identifier of the leader terminal.

The network device 103 may further send fifth information to another terminal in a terminal apparatus group, where the fifth information may indicate that the another terminal is not allowed to forward and schedule a resource configuration, and the another terminal and the terminal 101 belong to a same terminal apparatus group. The another terminal may be a terminal 102. For example, the network device 103 may send the fifth information after the operation described in S703. The network device may further send sixth information to the leader terminal, where the sixth information may be used to indicate that the leader terminal is allowed to forward, schedule, or both forward and schedule the resource configuration to a member terminal in the terminal apparatus group, or the sixth information may be used to indicate that the leader terminal is not allowed to forward schedule, or both forward and schedule the resource configuration to the member terminal in the terminal apparatus group.

It should be understood that the operations performed by the network device 103 may also be performed by a road side unit, and the road side unit can communicate with the terminal 101.

The foregoing describes the terminal apparatus identification method provided in the embodiments of the application with reference to FIG. 1 to FIG. 10. The following describes a communications apparatus provided in the embodiments of the application with reference to FIG. 11 and FIG. 12. The communications apparatus described herein may be configured to perform the method provided in the embodiments of the application. It may be understood that, to implement the foregoing functions, the communications apparatus described below may include corresponding hardware structures, and/or software modules for performing the functions. One of ordinary skill in the art should be easily aware that, in combination with units and algorithm operations of the examples described in the embodiments disclosed in this specification, the application can be implemented by hardware, computer software, or a combination of hardware and computer software. Whether a function is performed by hardware or hardware driven by computer software depends on particular applications and design constraints of the technical solutions.

Figure 11:
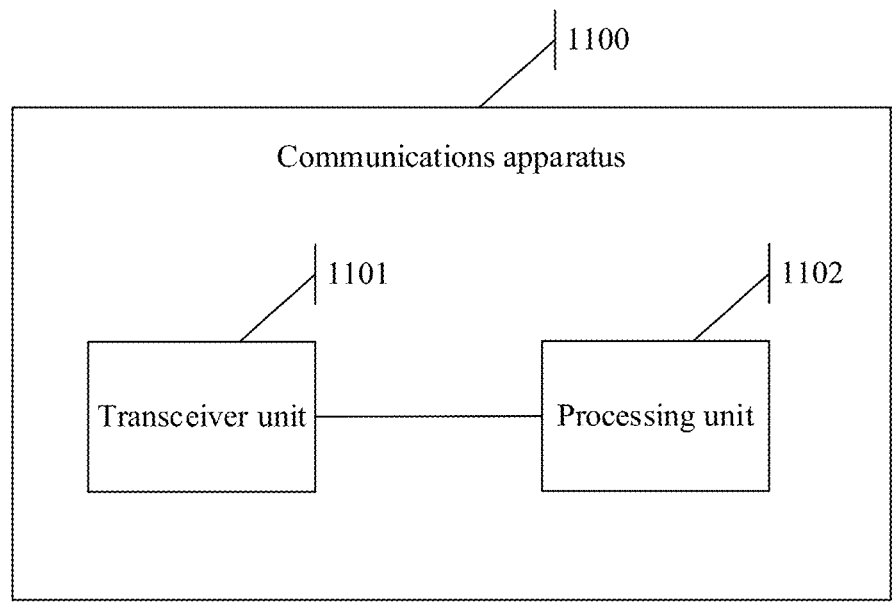
FIG. 11 is a schematic structural diagram of a communications apparatus according to an embodiment of the application.

FIG. 11 shows a communications apparatus 1100 according to an embodiment of the application.

The communications apparatus 1100 may be configured to perform operations performed by the first terminal apparatus/terminal 101 or the second terminal apparatus/terminal 102 in the foregoing method embodiments.

For example, the communications apparatus 1100 may include a transceiver unit 1101 and a processing unit 1102. The transceiver unit 1101 may be used by the communications apparatus to perform communication, and the processing unit 1102 may be used by the communications apparatus to implement functions implemented by the first terminal apparatus or the second terminal apparatus in the foregoing method embodiments.

For example, when performing the operations performed by the first terminal apparatus/terminal 101, the transceiver unit 1101 may be configured to send first information to an AS of a second communications apparatus by using an AS of a first communications apparatus, where the first information is used to determine that the first communications apparatus is a leader terminal apparatus in a terminal apparatus group. The terminal apparatus group is a terminal apparatus group to which the first communications apparatus belongs.

In an embodiment, the second communications apparatus may belong to the terminal apparatus group.

In at least some embodiments, the first information may include a mapping relationship between an upper-layer terminal identifier of the first communications apparatus and an AS identifier of the first communications apparatus, a mapping relationship between an upper-layer terminal identifier of the first communications apparatus and a vehicle-to-everything V2X layer identifier of the first communications apparatus, or an upper-layer terminal identifier of the first communications apparatus.

For example, the transceiver unit 1101 may be further configured to send second information to the second communications apparatus, where the second information may be used to indicate an upper-layer terminal identifier of the leader terminal apparatus in the terminal apparatus group.

The second information may include one or more of the following information: the upper-layer terminal identifier of the first communications apparatus (may include the V2X layer identifier, an identifier of a layer above a V2X layer, or both the V2X layer identifier and an identifier of a layer above a V2X layer), information used to indicate that the upper-layer terminal identifier is an identifier of the leader terminal apparatus in the terminal apparatus group, a group identifier group ID of the terminal apparatus group, an identifier of a member terminal in the terminal apparatus group, or information used to indicate a quantity of member terminals in the terminal apparatus group.

For example, the transceiver unit 1101 may send, by using an upper layer of the first communications apparatus, the second information to an upper layer of the second communications apparatus in an authentication process between the first communications apparatus and the second communications apparatus, a group creation process, a group member joining process, or a discovery discovery process.

The second information may be carried in any one of the following messages: a message used to request to set up a sidelink SL, a message used to indicate that an SL setup request is accepted, a message used to request to maintain an SL connection, or a message used to indicate that maintaining an SL connection is accepted. The SL is an upper-layer link between the first communications apparatus and the second communications apparatus.

In addition, the transceiver unit 1101 may further send the second information to a V2X layer of the second communications apparatus by using a V2X layer of the first communications apparatus. Before the transceiver unit 1101 sends the second information, the processing unit 1102 may be configured to notify the V2X layer of the first communications apparatus of third information by using an upper layer of the first communications apparatus, where the third information is used to indicate the upper-layer identifier of the leader terminal apparatus, is used to indicate that the first communications apparatus is the leader terminal apparatus, or both is used to indicate the upper-layer identifier of the leader terminal apparatus and is used to indicate that the first communications apparatus is the leader terminal apparatus.

The transceiver unit 1101 may be further configured to send a logical channel identifier ID to the AS of the second communications apparatus by using the AS of the first communications apparatus, where the logical channel ID is used to indicate whether the message carries an AS message; or the transceiver unit 1101 may be further configured to send an AS message indication to the AS of the second communications apparatus by using the AS of the first communications apparatus, where the AS message indication is used to indicate whether the message carries an AS message. By using this design, the AS of the second communications apparatus may determine whether the received message carries the AS message.

The transceiver unit 1101 may further send the second information to the V2X layer of the second communications apparatus based on a PC5-S protocol by using the V2X layer of the first communications apparatus.

The first information may be carried in an RRC message (for example, an RRC reconfiguration message), a physical layer message (for example, SCI or DCI), or a media access control layer MAC message (for example, a MAC control element CE message).

For example, the AS identifier of the first communications apparatus may include a physical layer identifier of the first communications apparatus. In an embodiment, the physical layer identifier of the first communications apparatus includes at least one of the following identifiers: a cell radio network temporary identifier C-RNTI of the first communications apparatus, a CS-RNTI of the first communications apparatus, an interruption radio network temporary identifier INT-RNTI of the first communications apparatus, a paging radio network temporary identifier P-RNTI of the first communications apparatus, a system information radio network temporary identifier SI-RNTI of the first communications apparatus, a semi-persistent channel state information radio network temporary identifier SP-CSI-RNTI of the first communications apparatus, a random access radio network temporary identifier RA-RNTI of the first communications apparatus, a temporary cell radio network temporary identifier temporary C-RNTI of the first communications apparatus, an inactive radio network temporary identifier I-RNTI of the first communications apparatus, a layer 1 source identifier of the first communications apparatus, or a layer 1 destination identifier of the first communications apparatus.

The V2X layer identifier of the first communications apparatus may include a layer 2 identifier of the first communications apparatus. In an embodiment, the layer 2 identifier of the first communications apparatus may include a layer 2 source identifier of the first communications apparatus or a layer 2 destination identifier of the first communications apparatus.

In another embodiment, the first information may further include information used to indicate that the first communications apparatus is the leader terminal apparatus in the terminal apparatus group. For example, in a message sent by the first communications apparatus, when a value of a bit is set to 0 (or 1), it indicates that the first communications apparatus is the leader terminal apparatus.

The first information may be carried in any one of the following messages: an AS groupcast message, an AS broadcast message, a PC5-RRC connection setup request message, a PC5-RRC connection setup message, a PC5-RRC connection reconfiguration message, a terminal capability reporting message, terminal assistance information, sidelink terminal information, a buffer status report, a message used to request to set up an SL, a message used to indicate that an SL setup request is accepted, or a message used to indicate configuration information of an SL, where the SL is an AS link between the first communications apparatus and the second communications apparatus.

For example, the first information includes one or more of the following information: the information used to indicate that the first communications apparatus is the leader terminal apparatus in the terminal apparatus group, a group identifier of the terminal apparatus group, an identifier of a member terminal in the terminal apparatus group, or information used to indicate a quantity of member terminals in the terminal apparatus group. In an embodiment, the first information may include AS groupcast groupcast configuration information of the SL.

In addition, the transceiver unit 1101 may further send fourth information to the second terminal apparatus, where the fourth information is used to indicate that the second terminal apparatus is not allowed to forward and schedule a resource configuration to another terminal apparatus, and the another terminal apparatus is a terminal apparatus in the terminal apparatus group.

When performing the operations performed by the second communications apparatus/terminal 102/network device 103/road side unit, the transceiver unit 1101 may receive first information from an AS of a first communications apparatus by using an AS of the second terminal apparatus, and the processing unit 1102 determines, based on the first information, that the first communications apparatus is a leader terminal apparatus in a terminal apparatus group. The first communications apparatus belongs to the terminal apparatus group.

The second communications apparatus may belong to the terminal apparatus group.

If the first information includes a first mapping relationship between an upper-layer terminal identifier of the first communications apparatus and an AS identifier of the first communications apparatus, when determining that the first terminal apparatus is the leader terminal apparatus, the processing unit 1102 may determine an AS terminal identifier of the leader terminal apparatus based on an upper-layer terminal identifier of the leader terminal apparatus and the first mapping relationship. If the AS identifier of the first terminal apparatus is the same as the AS terminal identifier of the leader terminal apparatus, the processing unit 1102 may determine that the first terminal apparatus is the leader terminal apparatus.

If the first information includes a second mapping relationship between an upper-layer terminal identifier of the first communications apparatus and a V2X layer identifier of the first communications apparatus, when determining that the first terminal apparatus is the leader terminal apparatus, the processing unit 1102 may determine a V2X layer terminal identifier of the leader terminal apparatus based on an upper-layer terminal identifier of the leader terminal apparatus and the second mapping relationship. The V2X layer identifier of the leader terminal apparatus may be determined based on the AS terminal identifier of the first terminal apparatus. If the V2X layer identifier of the first terminal apparatus is the same as the V2X layer terminal identifier of the leader terminal apparatus, the processing unit 1102 may determine that the first terminal apparatus is the leader terminal apparatus.

If the first information includes an upper-layer terminal identifier of the first communications apparatus, when determining that the upper-layer terminal identifier of the first communications apparatus is the same as an upper-layer terminal identifier of the leader terminal apparatus, the processing unit 1102 may determine that the first terminal apparatus is the leader terminal apparatus.

In an embodiment, the transceiver unit 1101 may further receive second information from an upper layer of the first communications apparatus by using an upper layer of the second communications apparatus, where the second information is used to indicate the upper-layer terminal identifier of the leader terminal apparatus in the terminal apparatus group. The transceiver unit 1101 may further indicate the upper-layer terminal identifier of the leader terminal apparatus to the AS of the second communications apparatus by using the upper layer of the second communications apparatus.

The second information includes one or more of the following information: the upper-layer terminal identifier of the first communications apparatus (may include the V2X layer identifier, an identifier of a layer above a V2X layer, or both the V2X layer identifier and an identifier of a layer above a V2X layer), information used to indicate that the upper-layer terminal identifier is an identifier of the leader terminal apparatus in the terminal apparatus group, a group ID of the terminal apparatus group, an identifier of a member terminal in the terminal apparatus group, or information used to indicate a quantity of member terminals in the terminal apparatus group.

For example, the transceiver unit 1101 may further receive, by using an upper layer of the second communications apparatus, the second information from an upper layer of the first communications apparatus in an authentication process between the first communications apparatus and the second communications apparatus, a group creation process, a group member joining process, or a discovery process.

The first information may be carried in an RRC reconfiguration message or a MAC CE message.

The second information may be carried in any one of the following messages: a message used to request to set up an SL, a message used to indicate that an SL setup request is accepted, a message used to request to maintain an SL connection, or a message used to indicate that maintaining an SL connection is accepted, where the SL is an upper-layer link between the first communications apparatus and the second communications apparatus.

For example, the transceiver unit 1101 may further receive a logical channel ID from the AS of the second communications apparatus by using the AS of the second communications apparatus, where the logical channel ID is used to indicate whether the message carries an AS message; or the transceiver unit 1101 may further receive an AS message indication from the AS of the second communications apparatus by using the AS of the second communications apparatus, where the AS message indication is used to indicate whether the message carries an AS message.

The AS identifier of the first communications apparatus may include a physical layer identifier of the first communications apparatus. In an embodiment, the physical layer identifier of the first communications apparatus may include at least one of the following identifiers: a cell radio network temporary identifier C-RNTI of the first communications apparatus, a CS-RNTI of the first communications apparatus, an interruption radio network temporary identifier INT-RNTI of the first communications apparatus, a paging radio network temporary identifier P-RNTI of the first communications apparatus, a system information radio network temporary identifier SI-RNTI of the first communications apparatus, a semi-persistent channel state information radio network temporary identifier SP-CSI-RNTI of the first communications apparatus, a random access radio network temporary identifier RA-RNTI of the first communications apparatus, a temporary cell radio network temporary identifier temporary C-RNTI of the first communications apparatus, an inactive radio network temporary identifier I-RNTI of the first communications apparatus, a layer 1 source identifier of the first communications apparatus, or a layer 1 destination identifier of the first communications apparatus.

In an embodiment, the V2X layer identifier of the first communications apparatus may include a layer 2 identifier of the first communications apparatus. In an embodiment, the layer 2 identifier of the first communications apparatus may include a layer 2 source identifier of the first communications apparatus or a layer 2 destination identifier of the first communications apparatus.

In another embodiment, the first information may include information used to indicate that the first communications apparatus is the leader terminal apparatus in the terminal apparatus group.

The first information may be carried in any one of the following messages: an AS groupcast message, an AS broadcast message, a PC5-RRC connection setup request message, a PC5-RRC connection setup message, a PC5-RRC connection reconfiguration message, a terminal capability reporting message, terminal assistance information, sidelink terminal information, a buffer status report, a message used to request to set up an SL, a message used to indicate that an SL setup request is accepted, or a message used to indicate configuration information of an SL, where the SL is an AS link between the first communications apparatus and the second communications apparatus.

The first information may include one or more of the following information: the information used to indicate that the first communications apparatus is the leader terminal apparatus in the terminal apparatus group, a group ID of the terminal apparatus group, an identifier of a member terminal in the terminal apparatus group, or information used to indicate a quantity of member terminals in the terminal apparatus group. For example, the first information includes AS groupcast groupcast configuration information of the SL.

If the second communications apparatus is a network device 103/road side unit, the transceiver unit 1101 may further send fifth information to a third communications apparatus, where the fifth information is used to indicate that the third communications apparatus is not allowed to forward and schedule a resource configuration to another communications apparatus, and the third communications apparatus and the another communications apparatus are terminal apparatuses in the terminal apparatus group.

In addition, if the communications apparatus 1100 is the first communications apparatus/terminal 101, the transceiver unit 1101 may be configured to send SL AS groupcast groupcast configuration information to a second communications apparatus, where the first communications apparatus and the second communications apparatus belong to a same terminal apparatus group, and the AS groupcast groupcast configuration information is used by the second communications apparatus to configure an SL AS groupcast parameter.

If the communications apparatus 1100 is the second communications apparatus/terminal 102, the transceiver unit 1101 may receive SL AS groupcast groupcast configuration information from the first communications apparatus, where the first communications apparatus and the second communications apparatus belong to a same terminal apparatus group, and the SL AS groupcast groupcast configuration information is used by the second communications apparatus to configure an SL AS groupcast parameter.

Figure 12:
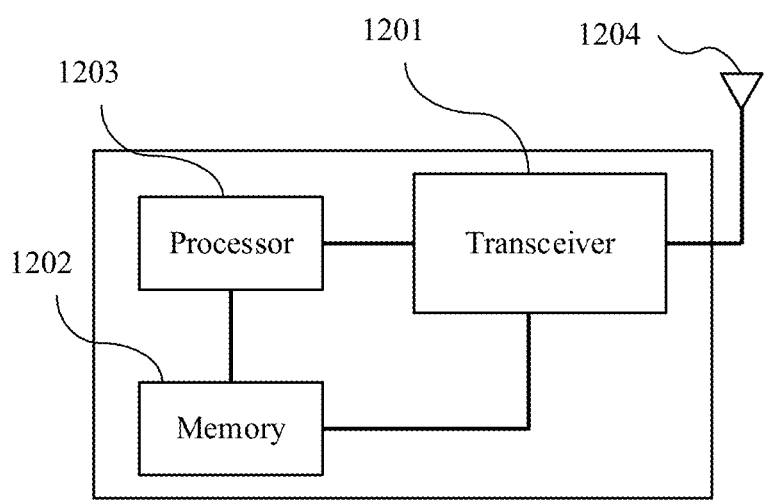
FIG. 12 is a schematic structural diagram of another communications apparatus according to an embodiment of the application.

In addition, as shown in FIG. 12, a communications apparatus 1200 provided in an embodiment of the application may further include a transceiver 1201, a memory 1202, and a processor 1203. The transceiver 1201 may be used by the communications apparatus 1200 to perform communication. The memory 1202 may be configured to store program instructions. The processor 1203 may be configured to invoke and run the program instructions from the memory 1202, to perform operations performed by the first terminal apparatus/terminal 101/second terminal apparatus/terminal 102/network device 103/road side unit in the foregoing method embodiments. In an embodiment, the transceiver 1201 may be configured to implement functions implemented by the transceiver unit 1101. The processor 1203 may be configured to implement functions implemented by the processing unit 1102.

For example, the communications apparatus 1200 may further include an antenna 1204, configured to be coupled to the transceiver 1201, to support the transceiver 1201 in implementing wireless communication via a Uu air interface, a PC5 air interface, or both via a Uu air interface and a PC5 air interface.

When performing the operations performed by the first terminal apparatus/terminal 101, the transceiver 1201 may be configured to send first information to an AS of a second communications apparatus by using an AS of a first communications apparatus, where the first information is used to determine that the first communications apparatus is a leader terminal apparatus in a terminal apparatus group. The terminal apparatus group is a terminal apparatus group to which the first communications apparatus belongs.

In an embodiment, the second communications apparatus may belong to the terminal apparatus group.

In at least some embodiments, the first information may include a mapping relationship between an upper-layer terminal identifier of the first communications apparatus and an AS identifier of the first communications apparatus, a mapping relationship between an upper-layer terminal identifier of the first communications apparatus and a vehicle-to-everything V2X layer identifier of the first communications apparatus, or an upper-layer terminal identifier of the first communications apparatus.

For example, the transceiver 1201 may be further configured to send second information to the second communications apparatus, where the second information may be used to indicate an upper-layer terminal identifier of the leader terminal apparatus in the terminal apparatus group.

The second information may include one or more of the following information: the upper-layer terminal identifier of the first communications apparatus (may include the V2X layer identifier, an identifier of a layer above a V2X layer, or both the V2X layer identifier and an identifier of a layer above a V2X layer), information used to indicate that the upper-layer terminal identifier is an identifier of the leader terminal apparatus in the terminal apparatus group, a group identifier group ID of the terminal apparatus group, an identifier of a member terminal in the terminal apparatus group, or information used to indicate a quantity of member terminals in the terminal apparatus group.

For example, the transceiver 1201 may send, by using an upper layer of the first communications apparatus, the second information to an upper layer of the second communications apparatus in an authentication process between the first communications apparatus and the second communications apparatus, a group creation process, a group member joining process, or a discovery discovery process.

The second information may be carried in any one of the following messages: a message used to request to set up a sidelink SL, a message used to indicate that an SL setup request is accepted, a message used to request to maintain an SL connection, or a message used to indicate that maintaining an SL connection is accepted. The SL is an upper-layer link between the first communications apparatus and the second communications apparatus.

In addition, the transceiver 1201 may further send the second information to a V2X layer of the second communications apparatus by using a V2X layer of the first communications apparatus. Before the transceiver 1201 sends the second information, the processor 1203 may be configured to notify the V2X layer of the first communications apparatus of third information by using an upper layer of the first communications apparatus, where the third information is used to indicate the upper-layer identifier of the leader terminal apparatus, is used to indicate that the first communications apparatus is the leader terminal apparatus, or both is used to indicate the upper-layer identifier of the leader terminal apparatus and is used to indicate that the first communications apparatus is the leader terminal apparatus.

The transceiver 1201 may be further configured to send a logical channel identifier ID to the AS of the second communications apparatus by using the AS of the first communications apparatus, where the logical channel ID is used to indicate whether the message carries an AS message; or the transceiver 1201 may be further configured to send an AS message indication to the AS of the second communications apparatus by using the AS of the first communications apparatus, where the AS message indication is used to indicate whether the message carries an AS message. By using this design, the AS of the second communications apparatus may determine whether the received message carries the AS message.

The transceiver 1201 may further send the second information to the V2X layer of the second communications apparatus based on a PC5-S protocol by using the V2X layer of the first communications apparatus.

The first information may be carried in an RRC message (for example, an RRC reconfiguration message), a physical layer message (for example, SCI or DCI), or a media access control layer MAC message (for example, a MAC control element CE message).

For example, the AS identifier of the first communications apparatus may include a physical layer identifier of the first communications apparatus. In an embodiment, the physical layer identifier of the first communications apparatus includes at least one of the following identifiers: a cell radio network temporary identifier C-RNTI of the first communications apparatus, a CS-RNTI of the first communications apparatus, an interruption radio network temporary identifier INT-RNTI of the first communications apparatus, a paging radio network temporary identifier P-RNTI of the first communications apparatus, a system information radio network temporary identifier SI-RNTI of the first communications apparatus, a semi-persistent channel state information radio network temporary identifier SP-CSI-RNTI of the first communications apparatus, a random access radio network temporary identifier RA-RNTI of the first communications apparatus, a temporary cell radio network temporary identifier temporary C-RNTI of the first communications apparatus, an inactive radio network temporary identifier I-RNTI of the first communications apparatus, a layer 1 source identifier of the first communications apparatus, or a layer 1 destination identifier of the first communications apparatus.

The V2X layer identifier of the first communications apparatus may include a layer 2 identifier of the first communications apparatus. In an embodiment, the layer 2 identifier of the first communications apparatus may include a layer 2 source identifier of the first communications apparatus or a layer 2 destination identifier of the first communications apparatus.

In another embodiment, the first information may further include information used to indicate that the first communications apparatus is the leader terminal apparatus in the terminal apparatus group. For example, in a message sent by the first communications apparatus, when a value of a bit is set to 0 (or 1), it indicates that the first communications apparatus is the leader terminal apparatus.

The first information may be carried in any one of the following messages: an AS groupcast message, an AS broadcast message, a PC5-RRC connection setup request message, a PC5-RRC connection setup message, a PC5-RRC connection reconfiguration message, a terminal capability reporting message, terminal assistance information, sidelink terminal information, a buffer status report, a message used to request to set up an SL, a message used to indicate that an SL setup request is accepted, or a message used to indicate configuration information of an SL, where the SL is an AS link between the first communications apparatus and the second communications apparatus.

For example, the first information includes one or more of the following information: the information used to indicate that the first communications apparatus is the leader terminal apparatus in the terminal apparatus group, a group identifier of the terminal apparatus group, an identifier of a member terminal in the terminal apparatus group, or information used to indicate a quantity of member terminals in the terminal apparatus group. In an embodiment, the first information may include AS groupcast groupcast configuration information of the SL.

In addition, the transceiver 1201 may further send fourth information to the second terminal apparatus, where the fourth information is used to indicate that the second terminal apparatus is not allowed to forward and schedule a resource configuration to another terminal apparatus, and the another terminal apparatus is a terminal apparatus in the terminal apparatus group.

When performing the functions implemented by the second communications apparatus/terminal 102/network device 103/road side unit, the transceiver 1201 may receive first information from an AS of a first communications apparatus by using an AS of the second terminal apparatus, and the processor 1203 determines, based on the first information, that the first communications apparatus is a leader terminal apparatus in a terminal apparatus group. The first communications apparatus belongs to the terminal apparatus group.

The second communications apparatus may belong to the terminal apparatus group.

If the first information includes a first mapping relationship between an upper-layer terminal identifier of the first communications apparatus and an AS identifier of the first communications apparatus, when determining that the first terminal apparatus is the leader terminal apparatus, the processor 1203 may determine an AS terminal identifier of the leader terminal apparatus based on an upper-layer terminal identifier of the leader terminal apparatus and the first mapping relationship. If the AS identifier of the first terminal apparatus is the same as the AS terminal identifier of the leader terminal apparatus, the processor 1203 may determine that the first terminal apparatus is the leader terminal apparatus.

If the first information includes a second mapping relationship between an upper-layer terminal identifier of the first communications apparatus and a V2X layer identifier of the first communications apparatus, when determining that the first terminal apparatus is the leader terminal apparatus, the processor 1203 may determine a V2X layer terminal identifier of the leader terminal apparatus based on an upper-layer terminal identifier of the leader terminal apparatus and the second mapping relationship. The V2X layer identifier of the leader terminal apparatus may be determined based on the AS terminal identifier of the first terminal apparatus. If the V2X layer identifier of the first terminal apparatus is the same as the V2X layer terminal identifier of the leader terminal apparatus, the processor 1203 may determine that the first terminal apparatus is the leader terminal apparatus.

If the first information includes an upper-layer terminal identifier of the first communications apparatus, when determining that the upper-layer terminal identifier of the first communications apparatus is the same as an upper-layer terminal identifier of the leader terminal apparatus, the processor 1203 may determine that the first terminal apparatus is the leader terminal apparatus.

In an embodiment, the transceiver 1201 may further receive second information from an upper layer of the first communications apparatus by using an upper layer of the second communications apparatus, where the second information is used to indicate the upper-layer terminal identifier of the leader terminal apparatus in the terminal apparatus group. The transceiver 1201 may further indicate the upper-layer terminal identifier of the leader terminal apparatus to the AS of the second communications apparatus by using the upper layer of the second communications apparatus.

The second information includes one or more of the following information: the upper-layer terminal identifier of the first communications apparatus (may include the V2X layer identifier, an identifier of a layer above a V2X layer, or both the V2X layer identifier and an identifier of a layer above a V2X layer), information used to indicate that the upper-layer terminal identifier is an identifier of the leader terminal apparatus in the terminal apparatus group, a group ID of the terminal apparatus group, an identifier of a member terminal in the terminal apparatus group, or information used to indicate a quantity of member terminals in the terminal apparatus group.

For example, the transceiver 1201 may further receive, by using an upper layer of the second communications apparatus, the second information from an upper layer of the first communications apparatus in an authentication process between the first communications apparatus and the second communications apparatus, a group creation process, a group member joining process, or a discovery process.

The first information may be carried in an RRC reconfiguration message or a MAC CE message.

The second information may be carried in any one of the following messages: a message used to request to set up an SL, a message used to indicate that an SL setup request is accepted, a message used to request to maintain an SL connection, or a message used to indicate that maintaining an SL connection is accepted, where the SL is an upper-layer link between the first communications apparatus and the second communications apparatus.

For example, the transceiver 1201 may further receive a logical channel ID from the AS of the second communications apparatus by using the AS of the second communications apparatus, where the logical channel ID is used to indicate whether the message carries an AS message; or the transceiver 1201 may further receive an AS message indication from the AS of the second communications apparatus by using the AS of the second communications apparatus, where the AS message indication is used to indicate whether the message carries an AS message.

The AS identifier of the first communications apparatus may include a physical layer identifier of the first communications apparatus. In an embodiment, the physical layer identifier of the first communications apparatus may include at least one of the following identifiers: a cell radio network temporary identifier C-RNTI of the first communications apparatus, a CS-RNTI of the first communications apparatus, an interruption radio network temporary identifier INT-RNTI of the first communications apparatus, a paging radio network temporary identifier P-RNTI of the first communications apparatus, a system information radio network temporary identifier SI-RNTI of the first communications apparatus, a semi-persistent channel state information radio network temporary identifier SP-CSI-RNTI of the first communications apparatus, a random access radio network temporary identifier RA-RNTI of the first communications apparatus, a temporary cell radio network temporary identifier temporary C-RNTI of the first communications apparatus, an inactive radio network temporary identifier I-RNTI of the first communications apparatus, a layer 1 source identifier of the first communications apparatus, or a layer 1 destination identifier of the first communications apparatus.

In an embodiment, the V2X layer identifier of the first communications apparatus may include a layer 2 identifier of the first communications apparatus. In an embodiment, the layer 2 identifier of the first communications apparatus may include a layer 2 source identifier of the first communications apparatus or a layer 2 destination identifier of the first communications apparatus.

In another embodiment, the first information may include information used to indicate that the first communications apparatus is the leader terminal apparatus in the terminal apparatus group.

The first information may be carried in any one of the following messages: an AS groupcast message, an AS broadcast message, a PC5-RRC connection setup request message, a PC5-RRC connection setup message, a PC5-RRC connection reconfiguration message, a terminal capability reporting message, terminal assistance information, sidelink terminal information, a buffer status report, a message used to request to set up an SL, a message used to indicate that an SL setup request is accepted, or a message used to indicate configuration information of an SL, where the SL is an AS link between the first communications apparatus and the second communications apparatus.

The first information may include one or more of the following information: the information used to indicate that the first communications apparatus is the leader terminal apparatus in the terminal apparatus group, a group ID of the terminal apparatus group, an identifier of a member terminal in the terminal apparatus group, or information used to indicate a quantity of member terminals in the terminal apparatus group. For example, the first information includes AS groupcast groupcast configuration information of the SL.

If the second communications apparatus is a network device 103/road side unit, the transceiver 1201 may further send fifth information to a third communications apparatus, where the fifth information is used to indicate that the third communications apparatus is not allowed to forward and schedule a resource configuration to another communications apparatus, and the third communications apparatus and the another communications apparatus are terminal apparatuses in the terminal apparatus group.

In addition, if the communications apparatus 1100 is the first communications apparatus/terminal 101, the transceiver 1201 may be configured to send SL AS groupcast groupcast configuration information to a second communications apparatus, where the first communications apparatus and the second communications apparatus belong to a same terminal apparatus group, and the AS groupcast groupcast configuration information is used by the second communications apparatus to configure an SL AS groupcast parameter.

If the communications apparatus 1100 is the second communications apparatus/terminal 102, the transceiver 1201 may receive SL AS groupcast groupcast configuration information from the first communications apparatus, where the first communications apparatus and the second communications apparatus belong to a same terminal apparatus group, and the SL AS groupcast groupcast configuration information is used by the second communications apparatus to configure an SL AS groupcast parameter.

It should be understood that, when performing the operations performed by the terminal 101/terminal 102 in the foregoing method embodiments, the communications apparatus 1100 the communications apparatus 1200, or both the communications apparatus 1100 and the communications apparatus 1200 may be a terminal, or a chip or a chip system used in the terminal. When performing the operations performed by the network device 103 in the foregoing method embodiments, the communications apparatus 1100, the communications apparatus 1200, or both the communications apparatus 1100 and the communications apparatus 1200 may be a base station, or a chip or a chip system used in the base station. The communications apparatus 1100, the communications apparatus 1200, or both the communications apparatus 1100 and communications apparatus 1200 may alternatively be a road side unit, or a chip or a chip system used in the road side unit.

All or some of the foregoing embodiments may be implemented by software, hardware (e.g., a circuit), firmware, or any combination thereof. When the software is used to implement the embodiments, all or some of the foregoing embodiments may be implemented in a form of a computer program product. The computer program product includes one or more computer instructions or computer programs. When the program instructions or the computer programs are loaded and executed on a computer, the procedures or functions according to the embodiments of the application are all or partially generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

The embodiments of the disclosure are described with reference to the flowcharts, block diagrams, or both the flowcharts and block diagrams of the method, the device (system), and the computer program product according to the embodiments of the disclosure. It should be understood that computer program instructions may be used to implement each process, each block in the flowcharts, the block diagrams, or any combination thereof. These computer program instructions may be provided for a general-purpose computer, a special-purpose computer, an embedded processor, or a processor of another programmable data processing device to generate a machine, so that the instructions executed by the computer or the processor of the another programmable data processing device generate an apparatus for implementing a function in one or more processes in the flowcharts, in one or more blocks in the block diagrams, or in any combination thereof.

These computer program instructions may also be stored in a computer readable memory that can instruct the computer or the another programmable data processing device to work in a manner, so that the instructions stored in the computer readable memory generate an artifact that includes an instruction apparatus. The instruction apparatus implements a function in one or more processes in the flowcharts, in one or more blocks in the block diagrams, or in any combination thereof.

These computer program instructions may also be loaded onto the computer or the another programmable data processing device, so that a series of operations are performed on the computer or the another programmable device, thereby generating computer-implemented processing. Therefore, the instructions executed on the computer or the another programmable device provide operations for implementing a function in one or more processes in the flowcharts, in one or more blocks in the block diagrams, or in any combination thereof.

Definitely, one of ordinary skill in the art can make various modifications and variations to embodiments of the disclosure without departing from the spirit and scope of the application. The application is intended to cover these modifications and variations of the embodiments of the disclosure provided that they fall within the scope of the following claims of the application and their equivalent technologies.

What is claimed is:

1. An apparatus for a first communications apparatus, comprising:
   at least one processor; and
   a memory coupled to the at least one processor, wherein the at least one processor is configured to:
   send, by an access stratum (AS) of the first communications apparatus, first information to an AS of a second communications apparatus, wherein the first information comprises a second mapping relationship between an upper-layer terminal identifier of the first communications apparatus and a vehicle-to-everything (V2X) layer identifier of the first communications apparatus, wherein
   the first information is used to determine that the first communications apparatus is a leader terminal apparatus in a terminal apparatus group, wherein a V2X layer terminal identifier of the leader terminal apparatus is determined, by the AS of the second communications apparatus, based on an upper-layer terminal identifier of the leader terminal apparatus and the second mapping relationship.

2. The apparatus according to claim 1, wherein the second communications apparatus belongs to the terminal apparatus group.

3. The apparatus according to claim 1, wherein the first information further comprises:
   a mapping relationship between the upper-layer terminal identifier of the first communications apparatus and an AS identifier of the first communications apparatus; or
   the upper-layer terminal identifier of the first communications apparatus.

4. The apparatus according to claim 1, wherein the at least one processor is further configured to:
   send second information to the second communications apparatus, wherein the second information is used to indicate an upper-layer terminal identifier of the leader terminal apparatus in the terminal apparatus group.

5. The apparatus according to claim 4, wherein the second information comprises one or more of the following information:
   the upper-layer terminal identifier of the first communications apparatus;
   information used to indicate that the upper-layer terminal identifier is an identifier of the leader terminal apparatus in the terminal apparatus group;
   a group identifier group ID of the terminal apparatus group;
   an identifier of a member terminal in the terminal apparatus group; or
   information used to indicate a quantity of member terminals in the terminal apparatus group.

6. The apparatus according to claim 4, wherein the second information is carried in any one of the following messages:
   a message used to request to set up a sidelink (SL);
   a message used to indicate that an SL setup request is accepted;
   a message used to request to maintain an SL connection; or
   a message used to indicate that maintaining an SL connection is accepted, wherein
   the SL is an upper-layer link between the first communications apparatus and the second communications apparatus.

7. The apparatus according to claim 4, wherein the sending the second information to the second communications apparatus comprises:
sending, by an upper layer of the first communications apparatus, the second information to an upper layer of the second communications apparatus in an authentication process between the first communications apparatus and the second communications apparatus, a group creation process, a group member joining process, or a discovery process.

8. The apparatus according to claim 4, wherein the sending the second information to the second communications apparatus comprises:
sending, by a V2X layer of the first communications apparatus, the second information to a V2X layer of the second communications apparatus; and
before the sending the second information to the second communications apparatus, the at least one processor is further configured to:
notify, by an upper layer of the V2X layer of the first communications apparatus, the V2X layer of the first communications apparatus of third information, wherein the third information is used to indicate the upper-layer terminal identifier of the leader terminal apparatus, is used to indicate that the first communications apparatus is the leader terminal apparatus, or is used to indicate the upper-layer terminal identifier of the leader terminal apparatus and is used to indicate that the first communications apparatus is the leader terminal apparatus.

9. The apparatus according to claim 1, wherein
the first information comprises information used to indicate that the first communications apparatus is the leader terminal apparatus in the terminal apparatus group.

10. The apparatus according to claim 9, wherein the first information is carried in any one of the following messages:
an AS groupcast message;
an AS broadcast message;
a PC5-RRC connection setup request message;
a PC5-RRC connection setup message;
a PC5-RRC connection reconfiguration message;
a terminal capability reporting message;
terminal assistance information;
a sidelink terminal information message;
a buffer status report BSR;
a message used to request to set up an SL;
a message used to indicate that an SL setup request is accepted; or
a message used to indicate configuration information of an SL, wherein
the SL is an AS link between the first communications apparatus and the second communications apparatus.

11. The apparatus according to claim 9, wherein the first information comprises one or more of the following information:
the information used to indicate that the first communications apparatus is the leader terminal apparatus in the terminal apparatus group;
a group ID of the terminal apparatus group;
an identifier of a member terminal in the terminal apparatus group; or
information used to indicate a quantity of member terminals in the terminal apparatus group.

12. The apparatus according to claim 9, wherein the first information comprises AS groupcast configuration information of the SL.

13. The apparatus according to claim 1, wherein the at least one processor is further configured to:
send, by the AS of the first communications apparatus, a logical channel identifier ID to the AS of the second communications apparatus, wherein the logical channel ID is used to indicate whether the first information carries an AS message; or
send, by the AS of the first communications apparatus, an AS message indication to the AS of the second communications apparatus, wherein the AS message indication is used to indicate whether the first information carries an AS message.

14. The apparatus according to claim 1, wherein the at least one processor is further configured to:
send fourth information to the second communications apparatus, wherein the fourth information is used to indicate that the second communications apparatus is not allowed to forward and schedule a resource configuration to another communications apparatus, and the another communications apparatus is a terminal apparatus in the terminal apparatus group.

15. An apparatus for a second communications apparatus, comprising:
at least one processor, and a memory coupled to the at least one processor,
wherein the at least one processor is configured to:
receive, by an access stratum (AS) of the second communications apparatus, first information from an AS of a first communications apparatus, wherein the first information comprises a second mapping relationship between an upper-layer terminal identifier of the first communications apparatus and a vehicle-to-everything (V2X) layer identifier of the first communications apparatus; and
determining based on the first information, that the first communications apparatus is a leader terminal apparatus in a terminal apparatus group, further comprising:
determining, by the AS of the second communications apparatus, a V2X layer terminal identifier of the leader terminal apparatus based on an upper-layer terminal identifier of the leader terminal apparatus and the second mapping relationship.

16. The apparatus according to claim 15, wherein the second communications apparatus belongs to the terminal apparatus group.

17. The apparatus according to claim 15, wherein the first information comprises a first mapping relationship between an upper-layer terminal identifier of the first communications apparatus and an AS identifier of the first communications apparatus; and
the determining, by the AS of the second communications apparatus based on the first information, that the first communications apparatus is the leader terminal apparatus in the terminal apparatus group comprises:
determining, by the AS of the second communications apparatus, an AS terminal identifier of the leader terminal apparatus based on an upper-layer terminal identifier of the leader terminal apparatus and the first mapping relationship.

18. The apparatus according to claim 15, wherein the first information comprises an upper-layer terminal identifier of the first communications apparatus; and
the determining, by the AS of the second communications apparatus based on the first information, that the first communications apparatus is the leader terminal apparatus in the terminal apparatus group comprises:

determining, by the AS of the second communications apparatus, that the upper-layer terminal identifier of the first communications apparatus is the same as an upper-layer terminal identifier of the leader terminal apparatus.

* * * * *